(12) United States Patent
Hartmann et al.

(10) Patent No.: US 6,505,342 B1
(45) Date of Patent: Jan. 7, 2003

(54) SYSTEM AND METHOD FOR FUNCTIONAL TESTING OF DISTRIBUTED, COMPONENT-BASED SOFTWARE

(75) Inventors: Jean S. Hartmann, Robbinsville, NJ (US); Claudio Imoberdorf, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 351 days.

(21) Appl. No.: 09/583,597

(22) Filed: May 31, 2000

(51) Int. Cl.$^7$ ................................. G06F 9/44
(52) U.S. Cl. .................... 717/104; 717/107; 717/125
(58) Field of Search ................... 717/100, 107, 717/124, 146, 125, 104, 136; 707/101, 513; 345/762, 763

(56) References Cited

U.S. PATENT DOCUMENTS

| | | | | | |
|---|---|---|---|---|---|
| 4,734,854 | A | * | 3/1988 | Afshar | 717/107 |
| 5,799,183 | A | * | 8/1998 | Iwashita | 707/2 |
| 5,892,947 | A | * | 4/1999 | DeLong et al. | 703/22 |
| 5,950,004 | A | * | 9/1999 | Bearse et al. | 714/25 |
| 6,209,125 | B1 | * | 3/2001 | Hamilton et al. | 717/100 |
| 6,243,857 | B1 | * | 6/2001 | Logan et al. | 717/111 |
| 6,421,822 | B1 | * | 7/2002 | Pavela | 345/771 |

OTHER PUBLICATIONS

MCITT and Interface Testing Language: National Institute of Standards and Technology, Nov. 1997.*
Marick, "The Craft of Software Testing", Prentice Hall, 1995.*
"Teach Yourself CORBA in 14 days", Sams Publishing, 1988.*
"Sams Teach Yourself UML in 24 Hours", Sams Publishing, 1999.*
"Mastering UML with Rational Rose 2002", SYBEX Inc., 2002.*
Sabnani et al., "An Algorithmic Procedure for Checking Safety Properties of Protocols," IEEE Transactions on Communications, vol. 37, No. 9, pp. 940–948, Sep. 1989.
Offutt et al., "Generating Tests from UML Specifications," Proceedings of $2^{nd}$ International Conference on UML '99, Oct. 1999.

* cited by examiner

*Primary Examiner*—Kakali Chaki
*Assistant Examiner*—William Wood
(74) *Attorney, Agent, or Firm*—Donald B. Paschburg

(57) ABSTRACT

A system and method for functional testing of distributed, component-based software that includes modeling dynamic behavior of a plurality of components using a plurality of Unified Modeling Language-based state machine representations; creating a plurality of normalized Unified Modeling Language-based state machine representations by converting the Unified Modeling Language based state machine representations into a normalized representation; creating a global behavioral model by combining the normalized Unified Modeling Language based state machine representations; mapping the global behavioral model to a Test Specification Language (TSL) test design; processing the Test Specification Language test design in a Test Design Environment to produce a plurality of Interface Test Language (ITL) test cases; mapping the ITL test cases to standard object-oriented code using an ITL compiler; generating a plurality of sink objects defined in an IDL file using a sink generator; generating an executable test driver containing a plurality of executable test cases using code from a test harness library and the above generated code using a standard object-oriented compiler; and executing the test cases with a test control center.

22 Claims, 14 Drawing Sheets

FIG. 6

| GROUP | COMB # | Transition s1 → t1 | | Transition s2 → t2 | | Equal event | Resulting transitions and states | |
|---|---|---|---|---|---|---|---|---|
| | | Connection is to FSM B | Transition type 1 | Connection is to FSM A | Transition type 2 | | New transition descriptor | Success or state |
| 1 | 1 | YES | SEND | YES | RECV | YES | COMM, connection, event | (t1, t2) |
| 1 | 1 | YES | RECV | YES | SEND | YES | COMM, connection, event | (t1, t2) |
| 1 | 1 | YES | SEND | YES | SEND | YES | - | - |
| 1 | 1 | YES | RECV | YES | RECV | YES | - | - |
| 2 | 4 | YES | SEND/RECV | YES | SEND/RECV | NO | - | - |
| 3 | 8 | NO | SEND/RECV | NO | SEND/RECV | * | A: SEND/RECV, connA, eventA<br>B: SEND/RECV, connB, eventB | (t1, s2)<br>(s1, t2) |
| 4 | 8 | NO | SEND/RECV | YES | SEND/RECV | * | A: SEND/RECV, connA, eventA | (t1, s2) |
| 4 | 8 | YES | INT/COMM | YES | SEND/RECV | * | B: SEND/RECV, connB, eventB | (s1, t2) |
| 5 | 16 | * | SEND/RECV | * | INT/COMM | * | A: INT/COMM | (t1, s2) |
| 5 | 16 | YES | INT/COM | NO | SEND/RECV | * | B: INT/COMM | (s1, t2) |
| 6 | 16 | * | INT/COM | * | SEND/RECV | * | A: SEND/RECV, connB, eventA<br>B: INT/COMM | (t1, s2)<br>(s1, t2) |
| 6 | 16 | NO | SEND/RECV | * | INT/COMM | * | A: SEND/RECV, connA, eventA<br>B: INT/COMM | (t1, s2)<br>(s1, t2) |
| 7 | 32 | * | INT/COMM | * | INT/COMM | * | A: INT/COMM<br>B: INT/COMM | (t1, s2)<br>(s1, t2) |

SYSTEM AND METHOD FOR FUNCTIONAL TESTING OF DISTRIBUTED, COMPONENT-BASED SOFTWARE

BACKGROUND OF THE INVENTION

1. Technical Field

The present invention relates generally to a system and method for the functional testing of distributed, software components during unit and integration testing and more particularly to a system and method of testing components, which combines test generation and test execution technology with commercial UML modeling tools to form a design-based testing environment.

2. Description of the Related Art

Increasing numbers of software developers are using the Unified Modeling Language (UML) and associated visual modeling tools as a basis for the design and implementation of their distributed, component-based applications. At the same time, it is necessary to test these components, especially during unit and integration testing.

While standardized testing strategies and tools have been available for IC (hardware) components for many years, the research and development of standardized testing techniques and tools for distributed software components has just begun. Three key technological factors are not only allowing developers to design and implement components, but at the same time, they are contributing towards the development of such testing strategies.

These factors include:

The definition of the Unified Modeling Language (UML), a standardized way of modeling the static structure and dynamic behavior of components and their interfaces;

The standardization of object-oriented middleware, for example, Microsoft's Component Object Model/ Distributed Component Object Model (COM/DCOM) and the Object Management Group's (OMG) Common Request Broker Architecture (CORBA);

The continued refinement of standard object-oriented programming languages, such as Java and C++, and integrated development environments that provide extensive support for creating distributed components.

As a result, developers are implementing large numbers of components ranging from relatively simple graphical user interface (GUI) components to sophisticated server-side application logic.

After designing and coding each software component, developers perform unit testing to ensure that each component correctly implements its design and is ready to be integrated into a system of components. This type of testing is performed in isolation from other components and relies heavily on the design and implementation of test drivers and test stubs. The purpose of these test drivers is to stimulate the component under test via its interfaces, while test stubs receive the responses from the component under test via these interfaces when stimulated. New test drivers and stubs have to be developed to validate each of the components in the system.

After unit testing is concluded, the individual components are collated, integrated into the system, and validated again using yet another set of test drivers/stubs. At each level of testing, a new set of custom test drivers/stubs is required to stimulate the components. While each component may have behaved correctly during unit testing, it may not do so when interacting with other components. Therefore, the objective of integration testing is to ensure that all components interact and interface correctly with each other, that is, have no interface mismatches.

Basically, as developers are delivering these complex, server-side components, they must also ensure that each component is delivered with a concise and unambiguous definition of its interfaces, and the legal order in which operations may be invoked on them. Component interfaces and their protocol specifications are being described or modeled in a variety of ways. For example, in the case of the Enterprise Java Beans Specification, this is achieved through contracts and UML Sequence Diagrams (also known as Message Sequence Charts). While a Sequence Diagram is useful at describing a specific interaction scenario, it may require a large number of such diagrams to completely specify the interaction of a complex component with its client(s).

Over the years, there have been numerous papers dedicated to the subject of test data generation. Moreover, a number of tools have been developed for use within academia and the commercial market. These approaches and tools have been based on different functional testing concepts and different input languages, both graphical and textual in nature.

However, few received any widespread acceptance from the software development community at large. There are a number of reasons for this. First, many of these methods and tools require a steep learning curve and a mathematical background. Second, the modeling of larger systems beyond single components could not be supported, both theoretically and practically. Third, the design notation, which would be used as a basis for the test design, was often used only in a particular application domain, for example, SDL (Specification and Description Language) is used predominantly in the telecommunications and embedded systems domain.

However, with the widespread acceptance and use of UML throughout the software development community as well as the availability of suitable tools, this situation may be about to change. Offutt J., Abdurazik A., Generating Test Cases from UML Specifications, Proceedings of 2nd International Conference on UML '99, October 1999, which presents an approach that involves generating test cases from UML Statecharts. However, their approach has a different focus in that they examine different coverage requirements. Their method also has several disadvantages. For example, it is only able to generate tests for a single component. Furthermore, it does not automate the test execution step in order for developers to automatically generate and execute their tests. In addition, it does not specifically address the problems and issues associated with modeling distributed, component-based systems.

Accordingly, there is a need for a system and method for the functional testing of distributed software components, which minimizes the testing costs, time and effort associated with initially developing customized test drivers and test stubs as well as repeatedly adapting and rerunning them for regression testing purposes at each level of integration.

SUMMARY OF THE INVENTION

The present invention is directed towards a system and method of defining the dynamic behavior of software components using Unified Modeling Language (UML)-based state machine representations, annotating them with testing specific information such as coverage criteria and data variations, interconnecting them in the case of multiple components, automatically deriving test cases from these state machine representations, and executing the test cases using a test execution environment developed specifically for testing components implemented using, for example, COM/CDOM and CORBA middleware.

In one aspect of the present invention, a method for testing distributed component-based software comprises the steps of: modeling dynamic behavior of a plurality of components with a plurality of UML-based state machine representations; creating a plurality of normalized state machine representations by converting the UML-based state machine representations into an internal representation; creating a global behavioral model by combining the normalized UML-based state machine representations; mapping the global behavioral model to a Test Specification Language (TSL) test design; processing the TSL test design using a Test Design Environment to produce a plurality of Interface Test Language (ITL) test cases; mapping these ITL test cases to standard object-oriented code using an ITL compiler and merging this code with additional code that is generated from an IDL (Interface Definition Language) file representing a plurality of sink objects; generating a plurality of executable test cases to form a test driver using a standard object-oriented language compiler by compiling the generated code with the test harness library code; and executing and monitoring these test cases with the test control center.

These and other aspects, features, and advantages of the present invention will become apparent from the following detailed description of the preferred embodiments, which is to be read in connection with the accompanying drawings.

BRIEF DESCRIPTION OF THE DRAWINGS

FIG. 6 shows a decision table used by the incremental composition and reduction algorithm to compute a global behavioral model according to one aspect of the present invention;

DETAILED DESCRIPTION OF THE PREFERRED EMBODIMENTS

It is to be understood that the method steps described herein are preferably implemented in software as an application comprising program instructions that are tangibly embodied on one or more program storage devices (e.g., RAM, ROM, etc.) and executable by any platform comprising suitable architecture. It is to be further understood that, because the process steps depicted in the accompanying Figures are preferably implemented in software, the actual connections between such steps may differ depending upon the manner in which the present invention is programmed. Given the teachings herein, one of ordinary skill in the related art will be able to contemplate these and similar implementations or configurations of the present invention.

1. Composition of UML-Based State Machine Representations

Figure 1:
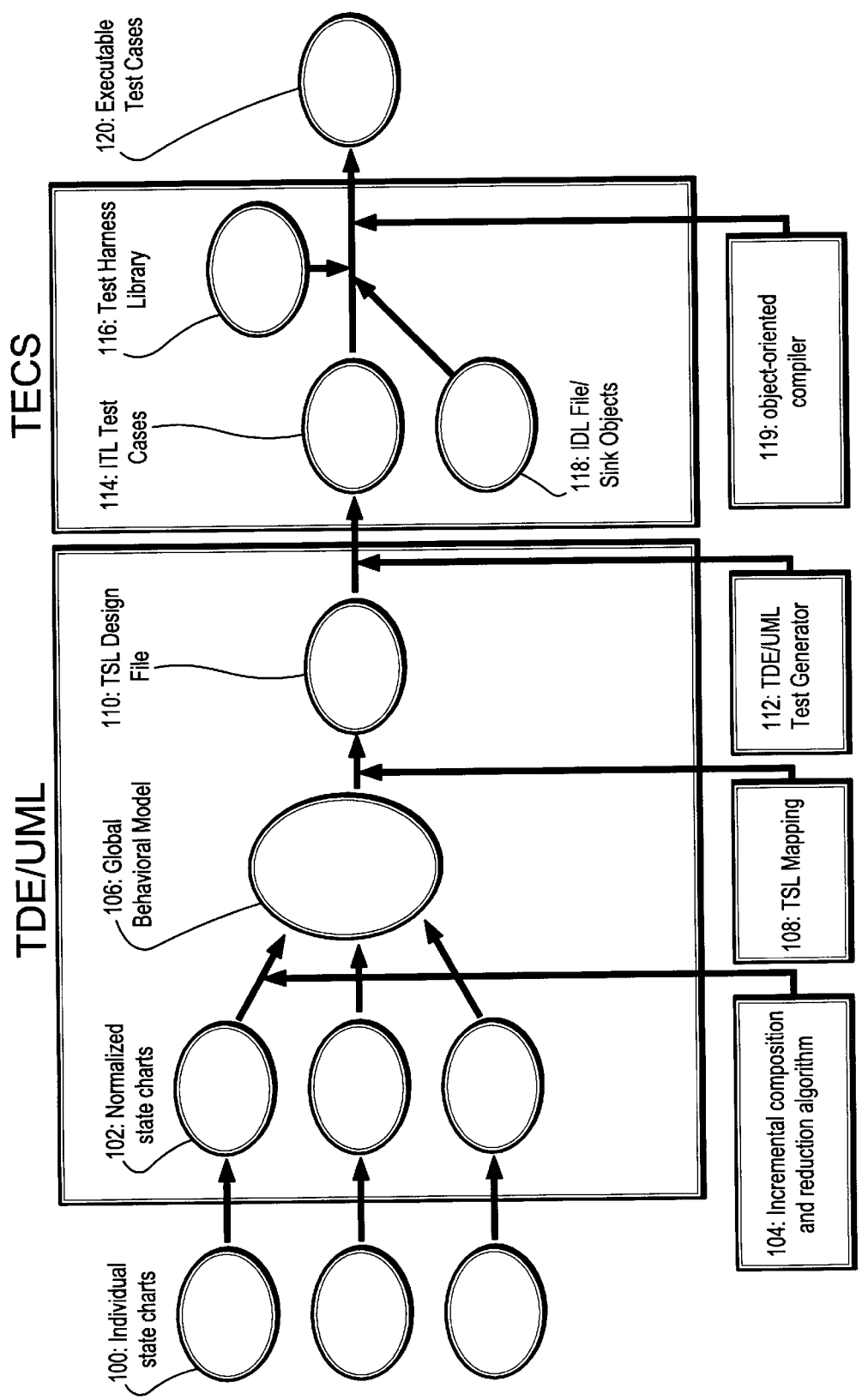
FIG. 1 is a flow diagram of a method for the functional testing of distributed, component-based software according to one aspect of the present invention.

Referring now to FIG. 1, a flow diagram depicts an example of the method of operation for the functional testing of a component-based application according to one aspect of the present invention. It should be understood that the elements shown in the FIGS. may be implemented in various forms of hardware, software or combinations thereof. Preferably, these elements are implemented in software on one or more appropriately programmed general purpose digital computers having a processor and memory and input/output interfaces. A technique is employed for the use of UML-based state machine representations based on visual modeling tools, such as the Unified Modeling Language (UML), in modeling the dynamic behavior of components as well as the communications between them. UML is a general-purpose visual modeling language that is used to specify, visualize, construct and document the artifacts of a software system. An individual UML-based state machine representation 100 (hereinafter, "state machine") can be used to describe the dynamic behavior of an individual component or object over time by modeling its lifecycle.

A normalized state machine 102 is a version of the individual state machine 100, wherein the individual state machine 100 is converted into an internal representation. A customized incremental composition and reduction algorithm 104 is applied to multiple normalized state machines to produce a global behavioral model 106. The global behavioral model is mapped to a Test Specification Language (TSL) test design in step 108 and generates a TSL test design file in step 110, which is then processed in a Test Design Environment (TDE) Test Generator with extensions for the Unified Modeling Language (TDE/UML) in step 112 to produce test cases using a test specification language called the Interface Test Language (ITL) 114. The ITL test cases 114 are used to build an executable test driver including executable test cases 120, with the help of the Test Environment for Distributed Component Based Software (TECS), the test execution tool, which combines the ITL test cases with sink objects 118 that are generated from an IDL file and a test harness library 116. The IDL file is a by-product of the implementation of a software component and is generated automatically with the help of a standard object-oriented language compiler.

Figure 2:
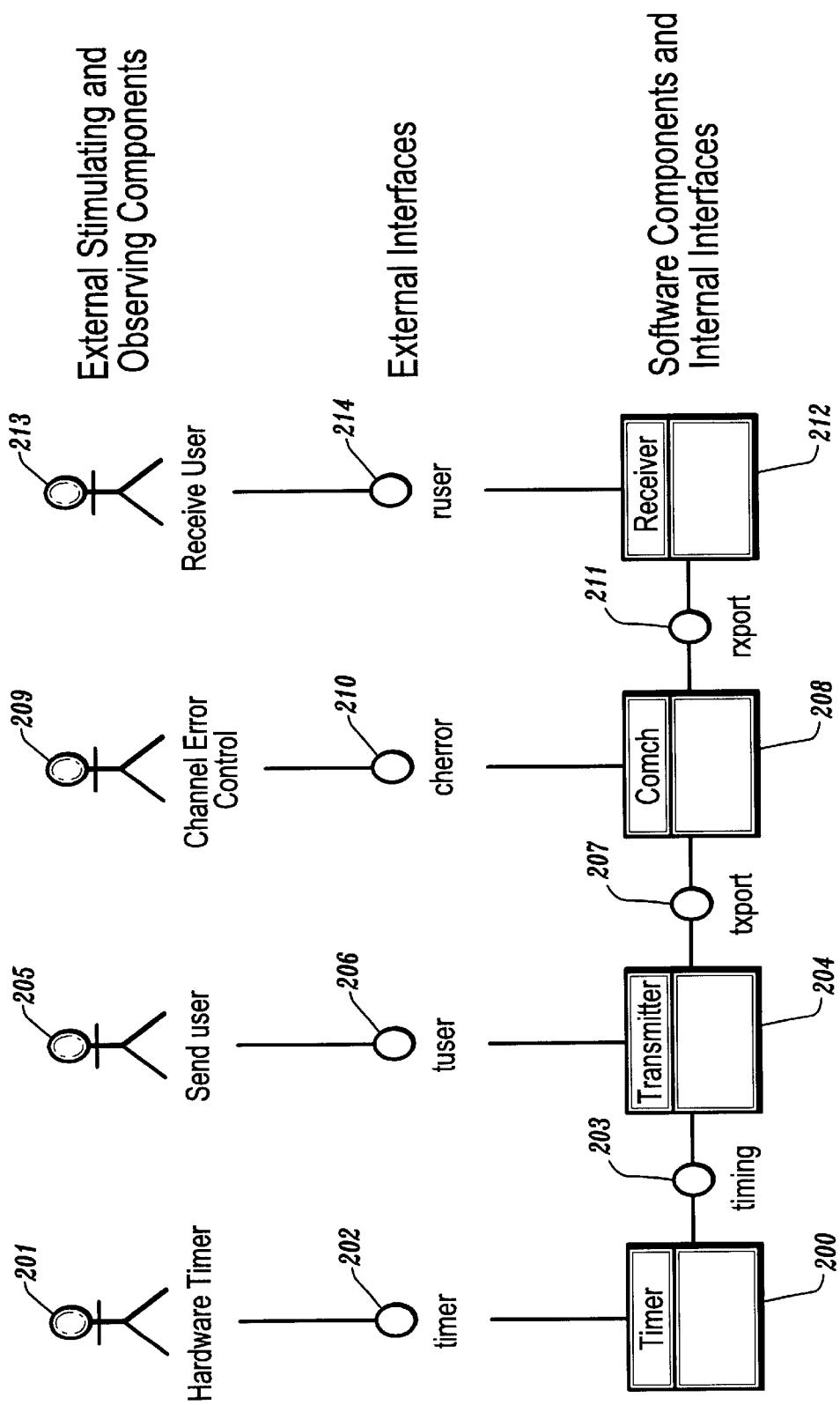
FIG. 2 is an example of an alternating bit communication protocol having four components according to the prior art.

To better convey the concepts of a component-based application, FIG. 2 illustrates an example of the components and interfaces of a software system. Specifically, it represents an alternating bit communication protocol, a term which stems from the message sequence numbering technique used to recognize missing or redundant messages and to keep up their correct order. The alternating bit communication protocol includes four separate components, for example: Timer 200, Transmitter 204, ComCh (Communication Channel) 208, and Receiver 212, and several internal as well as external interfaces and stimuli.

The protocol is a unidirectional, reliable communication protocol. A send user 205 invokes a Transmitter component 204 to send data messages -over a communication channel 208 and to a Receiver component 212, which then passes it on to receive user 213. External interfaces include timer 202, tuser 206, cherror 210, ruser 214; internal interfaces include timing 203, txport 207, and rxport 211. When such a transmission is successfully completed, send user 205 receives an acknowledgement message. However, there is a possibility that the communication channel can lose data (accomplished via the cherror interface) as well as acknowledgements. This can be avoided and reliable data connection ensured by observing possible timeout conditions, repeatedly sending messages if necessary (accomplished via the timer interface), and ensuring the correct order of the messages.

Figure 3:
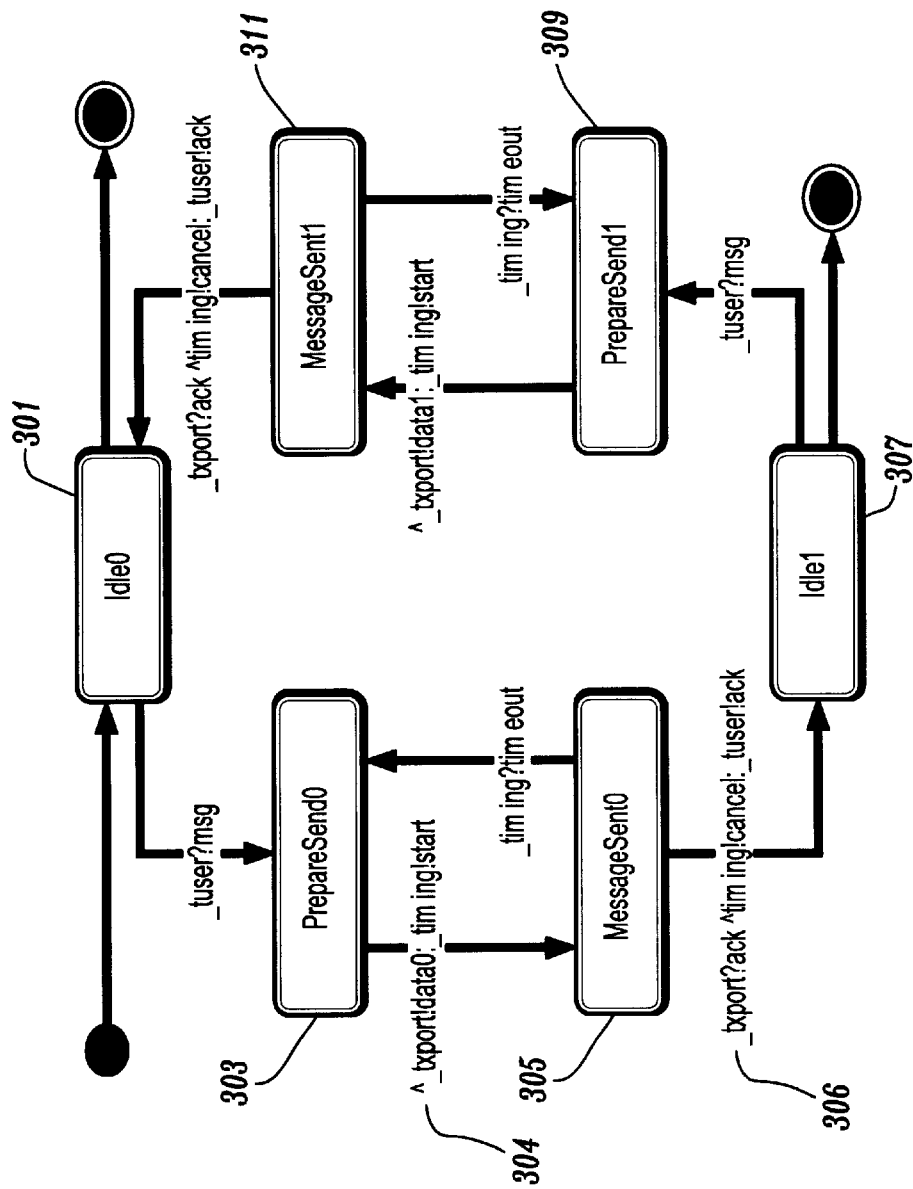
FIG. 3 is a Statechart diagram for the Transmitter component shown in FIG.2.

FIG. 3 illustrates an example of a UML-based state machine representation for the Transmitter component 204 shown in FIG. 2 above. A state machine diagram is a concise and compact way of describing the dynamic behavior of a component over time by modeling its lifecycle. The key elements described in a state machine are states, transitions, events, and actions.

The state machine depicted in FIG. 3 comprises a total of six states, which include a start state (301) and an end state (307). The states include Idle0 (301), PrepareSend0 (303), MessageSent0 (305), Idle1 (307), PrepareSend1 (309), and MessageSent1 (311). The transitions are labeled with event descriptions corresponding to external stimuli being received from the tuser interface 206 and internal stimuli being sent to the Timer component 200 via the timing interface 203 and received from the ComCh component 208 via the txport interface 207, all of which are depicted on FIG. 2. States and transitions define all possible states and changes of state an object can achieve during its lifetime. State changes occur as a result of reactions to events received from the object's interfaces. Actions correspond to internal or external method calls.

At present, UML does not provide an adequate mechanism for describing the communication between two components, so concepts from CSP (Communicating Sequential Processes) were adopted by the inventors to enhance its existing UML notation. In CSP, machine output operations are written as channel1!event1 which means that event1 is sent via channel1. A machine input operation is written as channel2?event1 where channel2 receives an event1. To show explicit component connections and to associate operations on the interfaces with events within the respective state machines, a transition labeling convention has been defined based on the notation used in CSP for communication operations. A unique name is assigned by the user to the connection between two communicating state machines while modeling the state machines. This name is used as a prefix for trigger (incoming) and send (outgoing) events. For example, a transition label in a state machine would be defined as follows:

_timing?timeout^_txport!data0

This transition label can be interpreted as receiving a trigger event timeout from connection timing followed by a send event data0 being sent to connection txport. Trigger events(also known as receive events) are identified by a separating question mark(?), whereas send events are identified by a leading caret (^, an existing UML notation) and a separating exclamation mark (!). Transitions may include multiple send and receive events. Multiple receive events within a transition label can be specified by separating them with a plus sign (+). Multiple send events with different event names can be specified by separating them by a colon(:).

Figure 4:
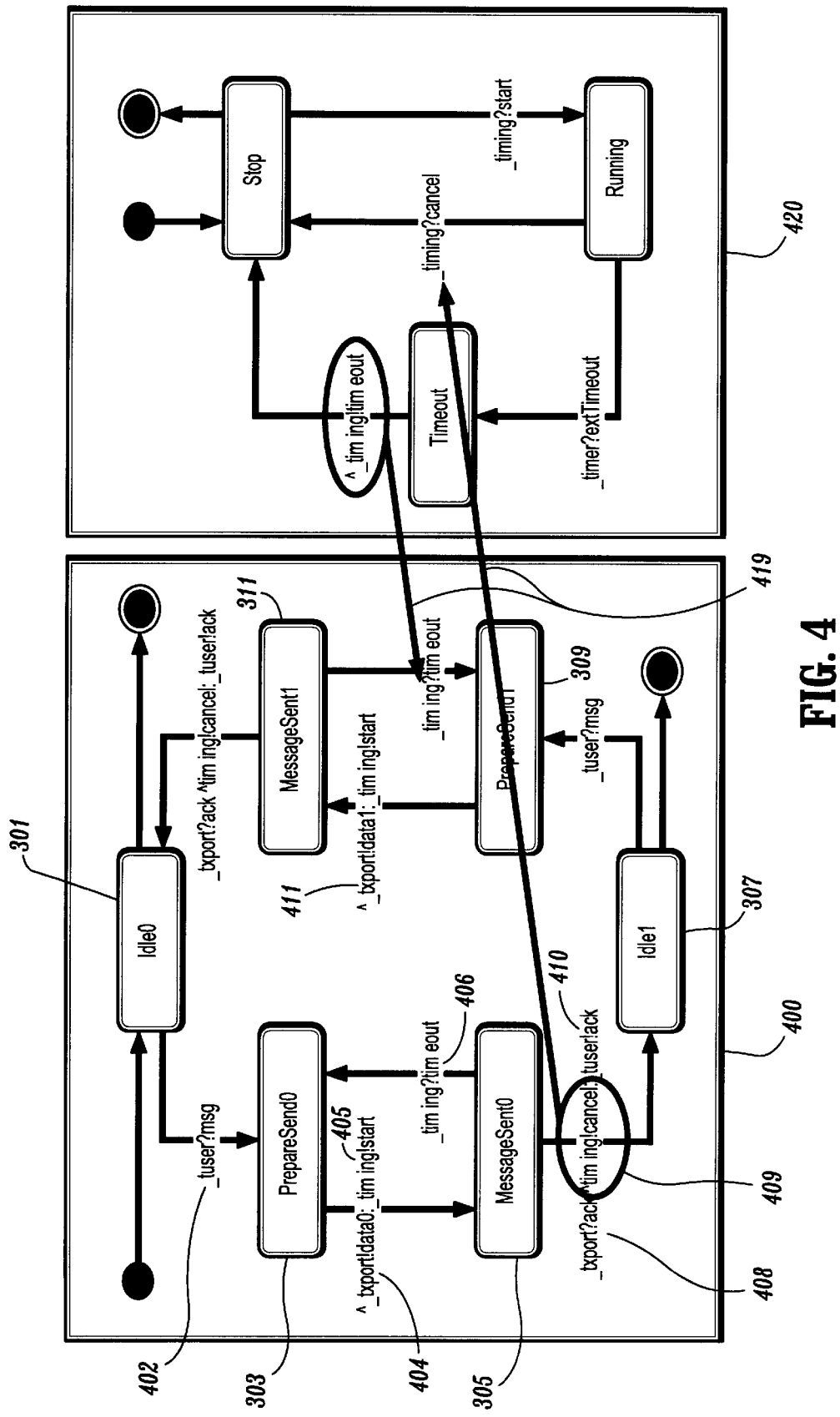
FIG. 4 shows two communicating Statecharts for the Transmitter and Timer components shown in FIG. 2.

FIG. 4 is an example of two communicating state machines for the Transmitter 400 and Timer 420 components. It shows how the two components interact via the communication semantics described. The labels on the transitions in each state machine refer to events occurring via the internal timing interface 203, the interface txport 207 with the ComCh component 208, and two external interfaces, timer 202 and tuser 206, which were all depicted in FIG. 2 above.

In FIG. 4, the Transmitter component 400 starts execution in state Idle0 (401) and waits for user input. If a message arrives from connection tuser, as illustrated here by _tuser?msg (402) the state changes to PrepareSend0 (303). Now, the message is sent to the communication channel, as illustrated by the transition label ^_txport!data0 (404). At the same time, the Timer component receives a start event, as illustrated by the transition label _timing!start (405). The transmitter component 400 is now in the state MessageSent0 (305) and waits until either the Timer component sends a timeout event (406) or the ComCh component sends a message acknowledgement ack (408). In case of a timeout, the message is sent again and the timer is also started again if an ack is received, an event 409 is sent to the Timer component 420 to cancel the timer and the user gets an acknowledgement (410) for successful delivery of the message. Following this, the same steps may be repeated but with a different message sequence number, which is expressed by the event data1 (411) instead of data0.

Individual state machines allow both Mealy and Moore finite state machines to be modeled. When the behavior of a reactive component is modeled, its action is specified by tying it to a state transition or to a state change. A state machine whose actions are all attached to transitions (as in the method described) is called a Mealy machine; a state machine whose actions are all attached to states is called a Moore machine.

A finite state machine defines a directed graph with nodes (representing the states) and edges (representing the transitions). They have one initial state and possibly several final states. On the other hand, a composed state machine can be considered as the product of multiple state machines. It is itself a state machine with the dynamic behavior of its constituents. As such, it would react and generate output as a result of being stimulated by events specified for the respective state machines.

In an illustrative example, a finite state machine used for this type of component specification is defined as A=(S, M, T, δ, $s_0$, F), where:

S is a set of states, unique to the state machine

M ⊂ S are states marked as intermediate states

T an alphabet of valid transition annotations, including transition type, connection name and event name. Transition type $\in$ {INT, COMM, SEND, RECEIVE}

$\delta$: S×T → S is a function describing the transitions between states $s_0 \in$ S is the initial state F $\subset$ S is a set of final states Initial and final states are regular states. The initial state gives a starting point for a behavior description. Final states express possible end points for the execution of a component.

The transition annotations T include a transition type as well as a connection name and an event name. Transition types can be INTernal, SEND, RECEIVE and COMMunication. Transitions of type SEND and RECEIVE are external events sent to or received from an external interface to the component's state machine. SEND and RECEIVE transitions define the external behavior of a component and are relevant for the external behavior that can be observed. An INTernal transition is equivalent to a $\epsilon$-transition (empty transition) of a finite state machine. It is not triggered by any external event and has no observable behavior. It represents arbitrary internal action. COMMunication transitions are special types of internal transitions representing interaction between two state machines. Such behavior is not externally observable. When composing state machines, matching pairs of SEND and RECEIVE transitions with equal connection and event names are merged to form COMMunication transitions. For example, in FIG. 4, the transitions highlighted by dark arrows (419) would be such candidates.

Figure 5:
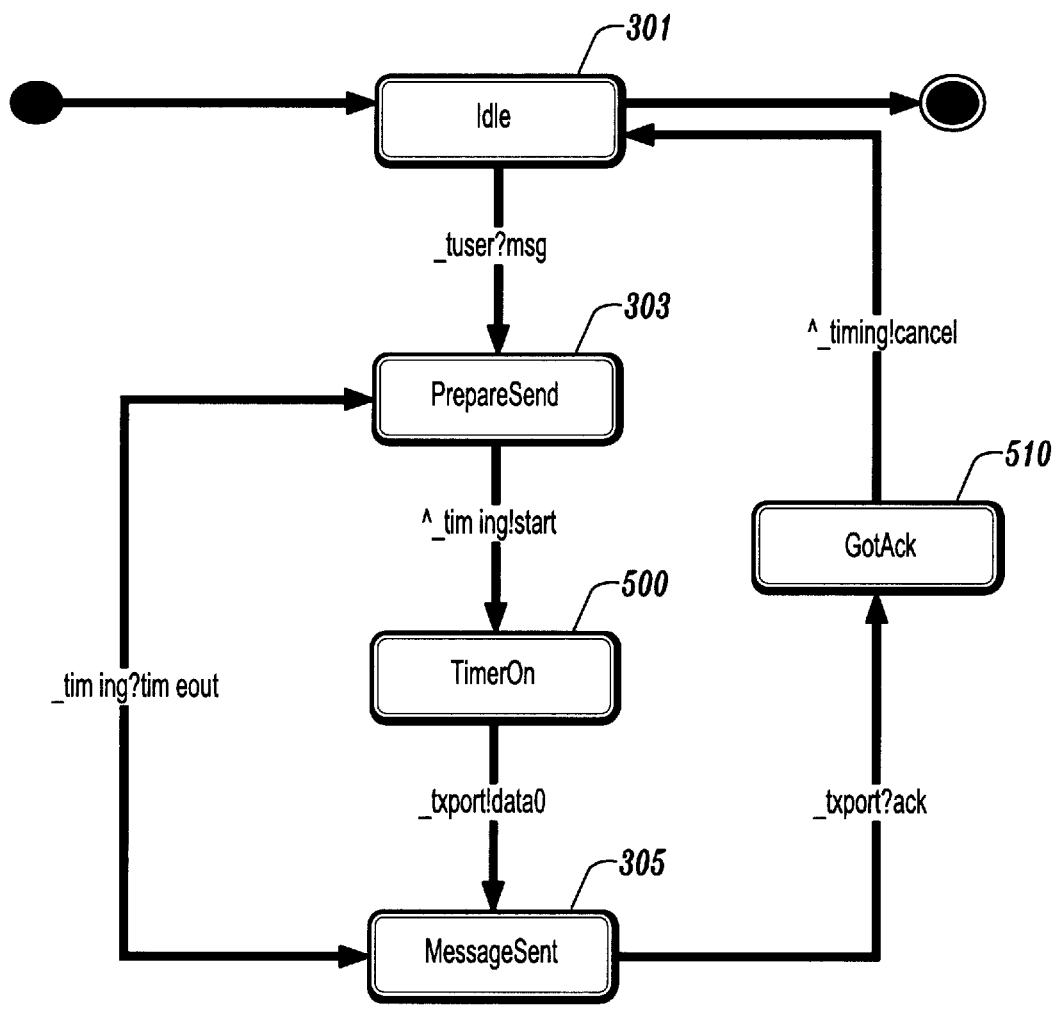
FIG. 5 shows a normalized Statechart for the Transmitter component of FIG. 3.

The individual state machines are then converted into normalized state machines, an example of which is depicted in FIG. 5. The process is discussed below:

An individual state machine permits transitions that include single actions. Every action expressed by a transition annotation is interpreted as an atomic action. Component interaction can occur after each of these actions. If several actions are grouped together without the possibility of interruption, the states between the transitions can be marked as intermediate states. Intermediate states (M $\in$ S) are thus introduced to logically group substructures of states and transitions. If several actions are grouped, they are separated into multiple consecutive steps as so-called microsteps, which are always executed in one run. These microsteps are the outgoing transitions of intermediate states. This technique is used as part of the process of converting the state machines into an internal representation. The result is a set of normalized state machines (see also FIG. 1, block 102).

FIG. 5 is an example of a state machine for a normalized version of the Transmitter object shown in FIG. 3 (also see FIG. 1, block 102). Two additional, intermediate states TimerOn (500) and GotAck (510) have been inserted to separate the multiple events _txport!data0:^_timing!start (304) and txport?ack^timing!cancel (306) between the PrepareSend, MessageSent and Idle states shown in FIG. 3. A normalized state machine is an internal representation of an individual state machine, where transitions have one send event or one receive event. As a result, the number of states and transitions in a normalized state machine is reduced.

Based on the above definition of a finite state machine, the structure of a composed state machine can be illustratively defined as follows: Let A=($S_1$, $M_1$, $T_1$, $\delta_1$, $s_{01}$, $S_{f1}$) and B=($S_2$, $M_2$, $T_2$, $\delta_2$, $s_{02}$, $S_{f2}$) be two state machines and $S_1 \cap S_2 = \emptyset$. The composed state machine C=A#B has the following formal definition:

A#B=(S', M', T', $\delta'$, $s_0'$, F')

$S' = S_1 \times S_2$ $M' \subset (M_1 \times S_2) \cup (S_1 \times M_2)$ $T' \subset T_{12} \cup T_{COMM}$ $T_{12} = (T_1 \cup T_2) \setminus \{$SEND, RECEIVE with connections between A and B$\}$ $T_{COMM} = \{$COMM for matching events from $T_1$ and $T_2\}$ $\delta': S' \times T' \rightarrow S'$ $\delta'$ is generated from $\delta_1$ and $\delta_2$ with the state machine composition schema $s_0' = (s_{01}, s_{02}) \in S'$.

$F' = \{(s_1, s_2) \in S' | s_1 \in F_1 \ \hat{} \ s_2 \in F_2\}$

For example, a global state for A#B is defined as a two-duple ($s_1$, $s_2$), where $s_1$ is a state of A and $s_2$ is a state of B. These two states are referred to as part states. Initial state and final states of A#B are element and subset of this product. The possible transition annotations are composed from the union of $T_1$ and $T_2$ and new COMMunication transitions that result from the matching transitions. Excluded are the transitions that describe possible matches. Either COMMunication transitions are created from these transitions that describe possible matches or they are omitted, because no communication is possible.

Following the modeling of normalized state machines, a global behavioral model is constructed, (see FIG. 1, block 106) in which the normalized state machines are combined. This global model permits the interaction of components to be tested. In the global behavioral model, also called a composed state machine, the significant properties, e.g., the behavior, of the individual state machines are preserved.

However, a prime concern with respect to the construction of a global model is the ability of the model to efficiently represent a very large collection of components. The prior art teaches a basic approach for composing two state machines by applying generative multiplication rules for states and transitions. A disadvantage of this technique, however, is that it leads to a large overhead since many unreachable states are produced that have to be removed in later steps. Therefore, the resulting product uses more resources than necessary and requires more computation time for generation and minimization.

To rectify this problem, the present invention incorporates an incremental composition and reduction algorithm (see FIG. 1, block 104) developed by Sabnani K. K., Lapone Aleta M., Uyar M. Umit: An Algorithmic Procedure for Checking Safety Properties of Protocols. IEEE Transactions on Communications, Vol. 37, No. 9, September 1989. In the present invention, this algorithm has been enhanced to include extensions that allow us to compose state machines. These extensions are described below and focus on the component connections, communication transitions, and the concept of intermediate states. The following pseudo-code shows the overall steps of this enhanced and customized algorithm or the present invention:

INPUT:
    ALL_SUBSYS: list of Subsystem;
VARIABLE DECLARATIONS:
    SUBSYSTEM: Subsystem;
    COMPONENTS: list of StateMachines;
    COMPOSED_FSM: StateMachine;
    SELECTED_FSM : StateMachine;
START:
    for each SUBSYSTEM in ALL_SUBSYS
    loop
        COMPONENTS=Get all state machines for SUBSYSTEM;

```
COMPOSED_FSM=Get first component from COM-
   PONENTS and remove it from COMPONENTS;
while COMPONENTS is not empty
loop
   SELECTED_FSM=Select matching state machine
      to COMPOSED_FSM from COMPONENTS and
      remove it from COMPONENTS;
   COMPOSED_FSM=Compose COMPOSED_FSM
      and SELECTED_FSM;
   COMPOSED_FSM=Use reduction algorithm
      COMPOSED_FSM;
end loop;
append COMPOSED_FSM to GLOBAL_FSM;
end loop;
OUTPUT:
   GLOBAL_FSM: list of StateMachine;
```

The present invention provides a mechanism whereby users can specify subsystems of components as well as the specific interfaces to be tested as part of their UML design. The benefit of defining such a subsystem is that it assists the incremental composition and reduction algorithm with the order of the composition steps, and thus helps to reduce the size of a given model. It also reflects a commonly used integration testing strategy known as 'bottom-up integration testing'.

Those skilled in the art will appreciate that various types of implementations exist on defining an integration test strategy. Using the alternating bit communication protocol example in FIG. 2, assuming that a bottom-up integration test strategy is to be used, a user may wish to integrate the Transmitter (204) and Timer (200) components into a subsystem, followed by the Receiver (212) and Comch (208) components into another subsystem. Afterwards, the two subsystems are grouped together to form the complete system. In this example, only the interface txport (207) between the two subsystems would need to be tested. Below are the subsystem definitions for the above example of a chosen integration test strategy:

```
subsystem TransmitterTimer {
   components: Transmitter, Timer; }
subsystem ComchReceiver {
   components: Comch, Receiver; }
subsystem ABProtocol {
   components: Transmitter, Timer, Comch, Receiver;
   interface: txport; }
```

The algorithm can now select a subsystem to process and it continues until every component of the subsystem is processed. During each iteration, a suitable component is selected from the list of the remaining components. The composition is done in the composition step. The component state machine COMPOSED_FSM is the resulting composed state machine. The list GLOBAL_FSM includes a list of composed state machines for the different subsystems.

The composition uses an incremental technique to build the composed state machine. The order of the composition steps determines the size and complexity of the result for the next step and therefore the effectiveness of the whole algorithm. The worst case for intermediate composition product is a composition of two components with no interaction. The maximum possible number of states and transitions is created in this case, resembling a pure product of the two state machines.

For best results, it is therefore important to select the most suitable component for the next composition step. The minimal requirement for the selected component is to have a common interface with the other component. This means that at least one connection exists to the existing previously calculated composed state machine.

A better strategy with respect to minimizing the size of intermediate results is to select the state machine with the highest relative number of communication relationships or interaction points. A suitable selection norm is the ratio of possible communication transitions to all transitions in one state machine. The ratio can be calculated for both state machines. An interaction grade function reflecting both ratios in connection with the finite state machine sizes. The function edges returns the number of transitions of a state machine:

$$\text{INTERACTION\_GRADE } (A,B) = r_A \cdot \text{edges}(A) + r_B \cdot \text{edges}(B)$$

The component with the maximum INTERACTION_GRADE value exposes the most interfaces to the currently composed state machine and should be selected. The absolute size of a component state machine does not affect the efficiency of the composition step and can therefore be ignored when selecting a suitable component.

The selected, matching state machine is composed with the current composed state machine. This procedure for one composition is called the composition step. It is the central part of the described algorithm for creating the global behavioral model.

For example, consider two component state machines where each state machine includes a number of states and transitions. The state machines have one initial state and can have several final states. First, a state machine is selected, which will include the composed state machine after the composition step. The states for the composed state machine are elements from the product of the states from the two source state machines. A global state is a duple of two states, called part states. Initial state is the combination of the two initial states.

Final states are global states, which part states are both final. If a state machine has no final states, the initial state is considered as final. The new global initial state is the starting point for the reachability computation.

The composition algorithm is applied to each combination of outgoing transitions of the two part states of a global state. An algorithm is illustratively shown in the following pseudo-code:

```
INPUT:
   FSM1: StateMachine;
   FSM2: StateMachine;
DECLARED VARIABLES:
   COMPOSED_FSM: StateMachine;
   MARKED, UNMARKED: list of State;
   ACT_STATE: State;
   PART1, PART2: State;
   TRANS1, TRANS2: Transition;
START:
   Create and initialize COMPOSED_FSM;
   MARKED=empty;
   UNMARKED=Create global initial state;
   while UNMARKED is not empty
   loop
      ACT_STATE=Get next state from UNMARKED;
      Remove ACT_STATE from UNMARKED;
      Append ACT_STATE to MARKED;
      PART1, PART2=Part states of ACT_STATE;
      for each outgoing transition TRANS1 in PART1
      loop
``` for each outgoing transition TRANS2 in PART2
loop
    Use composition schema with TRANS1, TRANS2 to
    create global transitions and global states in COMPOSED_FSM. New global states are added to
    UNMARKED;
end loop;
end loop;
end loop;
OUTPUT:
COMPOSED_FSM;

The returned state machine COMPOSED_FSM is the composition of the two source state machines FSM1 and FSM2.

The composition algorithm iterates over all states from the list UNMARKED. For every combination of outgoing transitions of the part states, the reachability computation table (FIG. 6) is used to compute new transitions for the composed state machine. If a new transition leads to a global state that is not part of the existing structure of the composed state machine, it is added to the list UNMARKED. The transition is added to the model. Exceptions exist, when part states are marked as intermediate. During computation, every reachable global state is processed and every possible new global transition is inserted into the composed state machine. The algorithm terminates when no unmarked states exist anymore, this means when every reachable global state was inserted into the model before and later processed.

FIG. 6 shows a decision table (600) for the reachability computation that results in new global states and transitions. The processed source state machines or finite state machines (FSM) are A and B, the currently processed global state within the composition of A and B is (s1, s2). It is composed of the two part states s1 and s2, where s1 is a state of FSM A and s2 is a state of FSM B. The decision table is consecutively used for every possible combination of outgoing transitions of s1 and s2. The decision table considers the following: FSM A has a transition s1→t1 (605). The transition has a transition type (one of SEND, RECV, INT, COMM), a connection name and an event name. FSM B has a transition s2→t2 (610). The transition also has a transition type, a connection name and an event name. If a transition type is internal (INT), the connection name and the event name can be ignored. Connections are named connA and connB for the respective FSM and event names are named eventA and eventB. If the connection and event are the same, they are just named connection and event. The decision table distinguishes if connections of one FSM are to the other FSM or external. Different connections between the same two source components are possible and are treated similarly.

The creation of new states and transitions is restricted where one of the part states is marked as intermediate state and the other is not. In this case, only transitions originating from the intermediate state are considered and inserted into the composed state machine. Communication transitions are created, if possible.

The illustrative decision table (600) shown in FIG. 6 has nine columns. The structure and grouping of this decision table is now explained in detail. Significant for a decision are the two transitions of the source state machines A and B. The possible combinations for the transitions are covered in columns 3 to 6. Columns 3 (601) and 5 (603) show whether a connection connects the two FSMs or not. Columns 4 (602) and 6 (604) show the transition type of a transition. Column 7 (606) indicates, whether both connection and event are equal.

Each row specifies a decision rule or a group of decision rules. For every applied rule, column 8 (607) shows the new transitions for the composed state machine and column 9 (608) gives the target states for the new transitions. The rules cover 128 different combination possibilities for the transitions. Several rules cover more than one combination. Fields that are ignored are shown by an asterisk (*). These different combinations do not affect the results. Other fields give possible choices and stand for multiple rules. The results are dependent upon these choices. In such a case, the same choice is used for creating the result. The origin of the choice is indicated by T1 for the transition of FSM A and T2 for the transition of FSM B. The second column shows the number of combinations of one row. The sum of all combinations is 128. Because division of the combination to the rules is disjunctive, all possible combinations are covered exactly once. The decision table defines a mathematically complete relation.

Column 1 (609) groups the possible combinations of transition and connection types in seven logical groups. The state machine composition tries to achieve interaction by matching transitions. Transitions with external connections or transitions of type INT and COMM can never match with transitions from the opposite FSM. A match is possible for send and receive transitions with a connection to the other FSM. These two possibilities are separated in the table. The first group includes the only two rules describing a successful match of the two transitions. The second group includes unsuccessful possible matches. Group three specifies rules, where both sides can never match and are therefore inserted at once. The fourth group includes rules, where one side can match, but not the other. The fifth group includes rules where one side has a possible match but the other side is of type internal or communication. The sixth group has rules where both sides can never match. In contrast to group three, one side has an internal or communication transition that is also inserted at once. The seventh group includes rules describing combinations of rules of type INTernal or COMMunication.

As we are composing the product of two state machines, the worst case complexity would be $O(n^2)$ assuming n is the number of states in a state machine. However, our approach often does much better than this due to the application of the heuristic reduction rules that can help to minimize the overall size of the global model during composition and maintain its observational equivalence.

The reduction algorithm being used has linear complexity with respect to the number of states. For example, the algorithm was applied to a complex communication protocol (ISDN Q.931), where it was shown that instead of generating over 60,000 intermediate states during composition, the reduction algorithm kept the size of the model to approximately 1,000 intermediate states. Similar results were achieved during use of the algorithm with other systems. The algorithm resulted in a reduction in the number of intermediate states by one to two orders of magnitude.

Figure 7:
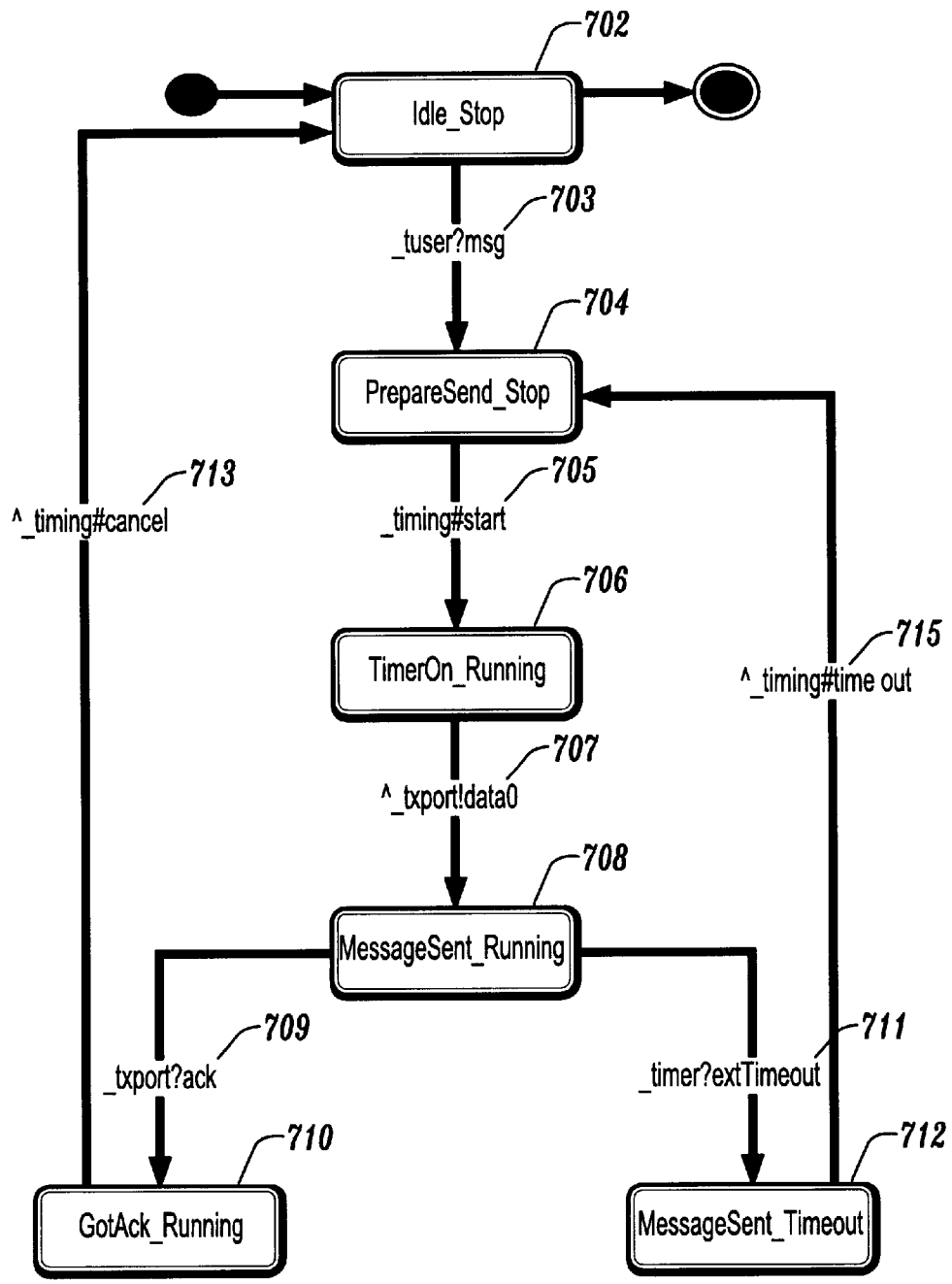
FIG. 7 shows a global behavioral model for a Transmitter-Timer subsystem in accordance with the present invention.

Taking the normalized state machines for the Transmitter component in FIG. 5 and the Timer component in FIG. 4, the composition algorithm advantageously needs to perform only one iteration to generate the global behavioral model, an example of which is depicted in FIG. 7.

A global initial state Idle_Stopped (702) is created using the initial states of the two state machines. This global initial state is added to the list of UNMARKED states. The decision table from FIG. 6 is now applied for every state within this list to generate new global states and transitions until the list is empty. The algorithm creates a global state machine comprising six states (702, 704, 706, 708, 710, 712) and seven transitions (703, 705, 707, 709, 711, 713, 715). Three COMMunication transitions are generated, which are identified by a hash mark ("#" sign) in the transition label showing the communication connection and event.

The example depicted in FIG. 7 also shows the application of the decision table. In the first global state, Idle__Stop (702), part state Idle has an outgoing receive transition to PrepareSend using an external connection. Part state Stop has also an outgoing receive transition to Running with a connection to the other component. According to Decision Rule #4 (611) of the decision table depicted in FIG. 6, the transition with the external connection is inserted into the composed state machine and the other transition is ignored. The new global receive transition leads to the global state PrepareSend__Stop (704).

For the next step, both part states include transitions which use internal connections.

They communicate via the same connection timing and the same event—these are matching transitions. According to Decision Rule #1 (612) of the table in FIG. 6, a communication transition is included in the composed state machine that leads to the global state TimerOn__Running (706). These rules are applied repeatedly until all global states are covered.

2. Test Generation

The design-based testing environment according to the present invention comprises two tools: the test generator tool TDE (Test Development Environment) with extensions for UML (TDE/UML) and the test execution tool, TECS (Test Environment for Distributed Component-Based Software). Collectively, these tools are known as the TnT environment.

After modeling individual or collections of components using state machines and establishing a global behavioral model of these state machines, this model can then be used as the basis for automatic test generation and test execution during unit and integration testing, in accordance with the present invention.

For test generation, the Test Development Environment (TDE) is employed. TDE processes a test design file (see FIG. 1, block 110) written preferably using the Test Specification Language (TSL). This language is based on a category-partition method, which identifies behavioral equivalence classes within the structure of a system under test.

A category or partition is defined by specifying all possible data choices that it can represent. Such data choices can be either data values, references to other categories or partitions, or a combination of both. The data values may be fragments of text (or strings) representing test scripts, code, or case definitions, which later can form the contents of a test case.

A TSL test design (see FIG. 1, block 110) is now created from the global behavioral model by mapping the model's states and transitions to TSL categories or partitions, and choices. States are the equivalence classes and are therefore represented by partitions. Partitions are used for equivalence class definitions, because paths through the state machine are not limited to certain outgoing transitions for a state; this would be the case when using a category. Each transition from the current state is represented as a so-called choice of the category/partition, including a test data string (the send and receive event annotations) and a reference to the next state. A final state defines a choice with an empty test data string.

A recursive, directed graph is built by TDE that has a root category/partition and includes all the different paths of choices to plain data choices. This graph may include cycles depending on the choice definitions and is equivalent to the graph of the global state machine. A test frame (also known as a test case) is one instance of the initial data category or partition, that is, one possible path from the root to a leaf of the (potentially infinite) reachability tree for the graph.

Figure 8:
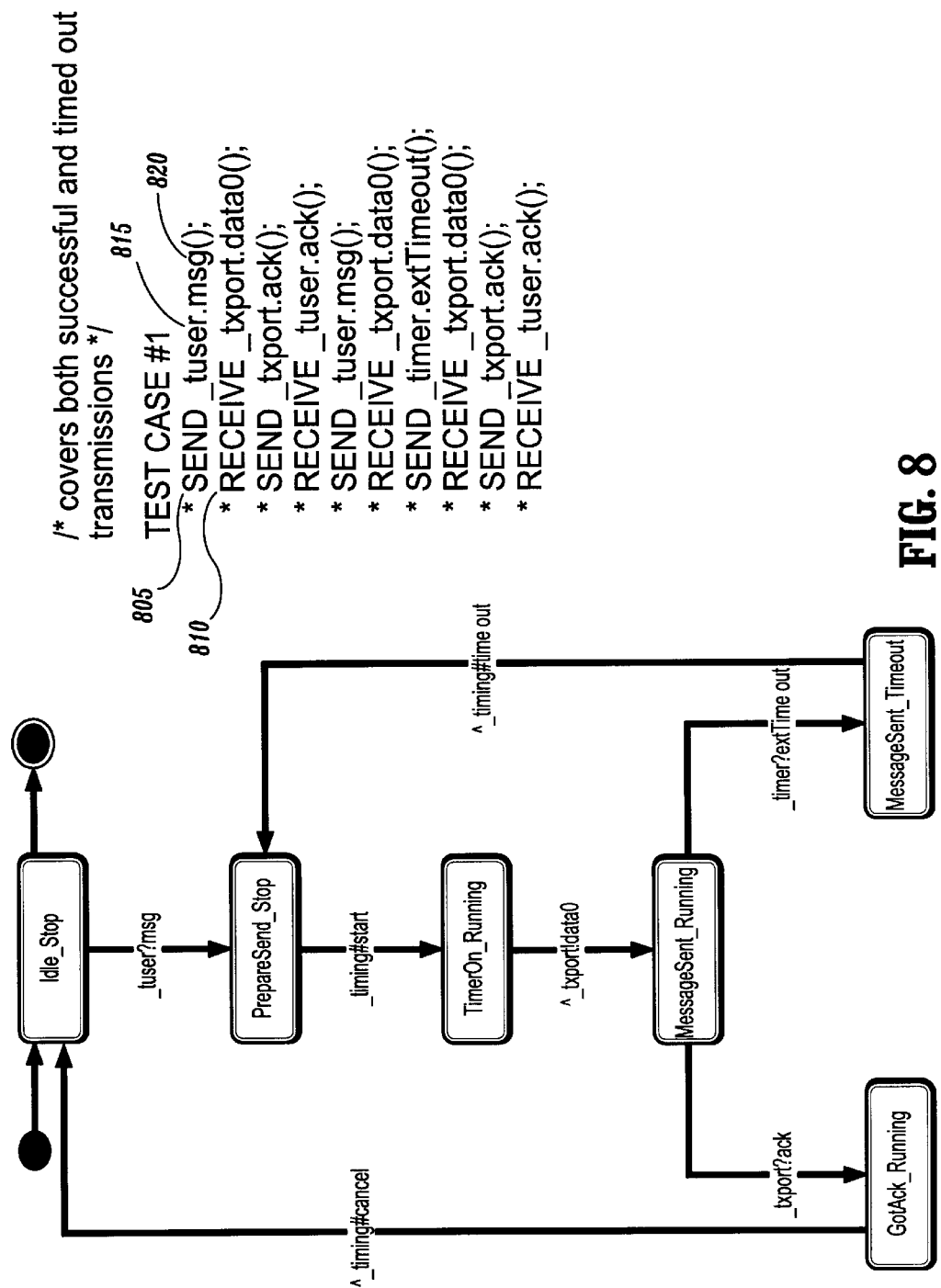
FIG. 8 shows a test case for the Transmitter-Timer subsystem shown in FIG. 7.

FIG. 8 presents an illustrative example of a test case that is derived from the global behavioral model shown in FIG. 7. This test case is sufficient to exercise the interfaces, txport, tuser and timer defined for the components. Each line of this generic test case format represents either an input event or an expected output event. For example, in the first two lines of the depicted test case format, the stimulating event uses the string SEND (805) and the expected response uses the string RECEIVE (810). Each string is followed by a connection name (815) and an event name (820). In this example, the events have no parameters, but each event can have a set of parameters and values that vary from test case to test case. In addition, the model specification is enhanced with annotations about possible data values and types for these parameters, as well as test requirements for these values. TDE allows test case generation using data variations with samples out of a possible range of parameter values. Pre- and post-conditions can be used to constrain valid data values. These constraints can be checked during test execution, which extends the error detecting possibilities.

An instantiation of a category or partition is a random selection of a choice from the possible set of choices defined for that category/partition. In the case of a category, the same choice is selected for every instantiation of a test case. This restricts the branching possibilities of the graph. With a partition, however, a new choice is selected at random with every new instantiation. This allows full branching within the graph and significantly influences test data generation. The contents of a test case include all data values associated with the edges along a path in the graph.

The TSL language provides two types of test generation coverage requirements:

Generative requirements control which test cases are instantiated. If no generative test requirements are defined, no test frames are created. For example, coverage statements can be defined for categories, partitions and choices.

Constraining requirements cause TDE to omit certain generated test cases. For example, there are maximum coverage definitions, rule-based constraints for category/partition instantiation combinations, instantiation preconditions and instantiation depth limitations. Such test requirements can be defined globally within a TSL test design or attached to individual categories, partitions or choices.

TDE (see FIG. 1, block 112) creates test cases to satisfy all specified coverage requirements. Input sequences for the subsystem are equivalent to paths within the global behavioral model that represents the subsystem, starting with the initial states. Receive transitions with events from external connections stimulate the subsystem. Send transitions with events to external connections define the resulting output that can be observed by the test execution tool. All communication is performed through events. For unit test purposes, the default coverage criterion is that all transitions within a state machine must be traversed at least once. For integration testing, only those transitions that involve component interactions are exercised. If a subsystem of components is defined as part of the modeling process, coverage requirements are formulated to ensure that those interfaces, that is, transitions are tested.

Figure 9A:
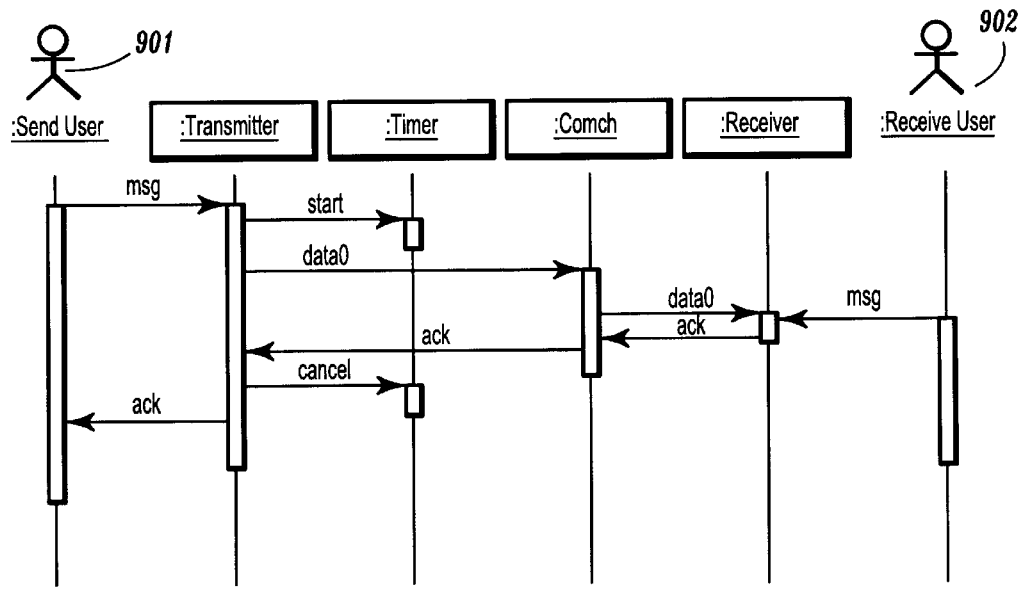
FIGS. 9A and 9B show sequence diagrams for the execution of the test case shown in FIG. 8.
Figure 9B:
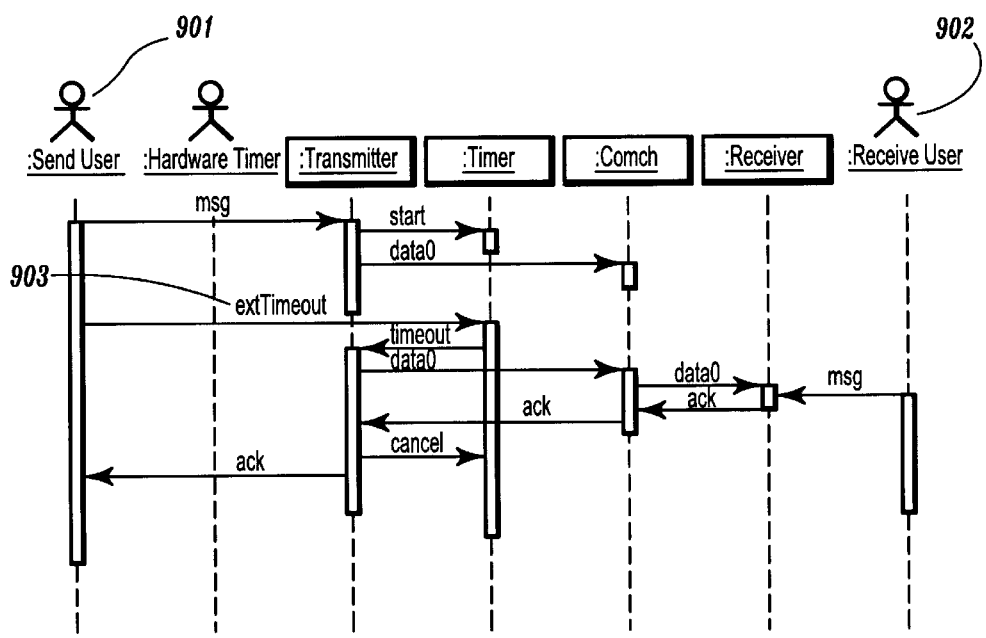

An example of the Sequence Diagrams for the execution of this test case are shown in FIGS. 9A and 9B. FIG. 9A depicts an example of one particular scenario of a successful transmission between two different actors (901) and (902) in a test driver, and FIG. 9B depicts an example of an unsuccessful transmission. Note that the external connection timer has a possible event extTimeout (903). This event allows a timeout to be triggered without having a real hardware timer available.

3. Test Execution

Test cases that are generated by TDE/UML are preferably described using an Interface Test Language (ITL). ITL represents a test specification language from which TECS creates executable test drivers and test cases. ITL can be seen as an extension to a standard object-oriented language; in the present invention, additional constructs have been added. The following example of a test case illustrates the key features of this test specification language:

```
Testcase t1 Extends tBase {
  Body {
    Action a1
    {
    result=server.doXY();
    } Postcondition (S_OK==result) Observer
    {
      Pattern sink.onOk && sink.done && sink.msg
    }
    Action a2
    {
    ...
    }
  }
}
```

One of the main constructs is the test purpose, which consists of an Action and an Observe block. The action includes the standard object-oriented language code needed to stimulate the interfaces of the component under test. Within a Postcondition construct, return and output values resulting from stimulating the component interface can be compared with the expected values, in this case, S_OK.

The action is followed by an optional observe block which defines a set of event patterns. These event patterns describe the expected behavior of the component under test in response to the stimulus executed in the action block. In the above example, a successful test execution would mean that each of the three events onOk, done and msg have to occur once as result of performing the stimulus Action a1.

As soon as TECS is able to match responses from the component under test with this defined event pattern, test execution continues to the next action, in the case of the above example, with action a2, and so forth.

Each of the test specification language constructs will illustratively be defined; the precise grammatical notation is shown in Appendix 1. It is to be noted that Appendix 1 is not an exhaustive list; other commands may be included.

Construct 1: TestCase

A test case is a type of container for the test purposes, initialization and cleanup code. A test case can have an optional identifier, which allows identification of the test case. If it is omitted, there will be an identifier automatically generated. Test cases also support inheritance.

```
Testcase TestXY Extends BaseTestCase {
...
```

In the above example, the test case TestXY inherits from the test case BaseTestCase. The semantics of the inheritance is similar to that of a standard object-oriented languages. TestXY inherits all attributes defined in BaseTestCase's attribute definition block. The initialization and cleanup blocks can be viewed as virtual methods. That means if TestXY does not implement an initialization block then the initialization block of the base test case will be used. A common usage of inheritance between test cases is the re-use of initialization and cleanup code. It is conceivable that many test cases need the same test frame. Instead of re-implementing the init and cleanup code in each test case, it is much better to do this once in a basic test case from which the other test cases can inherit.

Construct 2: Definition Block

A definition block contains a set of definition statements. A definition statement allows defining attributes for a test case. It also provides a means for defining sink objects to be used from within a test case.

Syntax:

DefinitionBlock:
  Define '{' {DefinitionStatement} '}'

DefinitionStatement:
  SinkDefinitionStatement|AttributeDefinition|EmptyStatement Construct 3: SinkDefinition Statement The sink definition statement defines a sink object, which is used within a test case. The first identifier specifies the type of the object. The second identifier specifies the attribute name through which the sink object is accessible. Sink objects defined with the sink definition statement are automatically instantiated and deleted by the test case. An example:

```
IncludeIdl "IfcXY.idl";
Generate Sink CSimple From ISimple;
Testcase Test1{
  Define {
    Sink CSimple As simpleSink; }
  ...
}
```

In the above example, a sink object with the name simpleSink of type CSimple will be part of the test case Test1.

Construct 4: AttributeDefinition Block

With an attribute definition block, any attributes can be defined in the target programming language, to be used within a test case. An example:

```
Testcase TC1{
  Define{
    Attribute{
      short counter;
      SampleServer server;
    }
  }
}
```

The above example defines two attributes in the syntax of the target language, the attribute counter of type short and the attribute server of type SampleServer.

Construct 5: TestCaseInitialization

The initialization block will be executed before the test case body. It includes any necessary initialization code. A common piece of code is one that acquires a reference to the server-based component object to be tested. Another task might be to register a sink interface with the server. The initialization block may include a set of test statements. With the help of the action and observe statements, initialization code that exemplifies asynchronous behavior can be placed in the initialization block.

Syntax:
   TestCaseInitialization:
     Init TestBlock
   TestBlock:
     '{' {TestStatement} '}'

Construct 6: TestCaseCleanup

The cleanup block will be executed after the test case body is completed. Any cleanup work can be done in this block; for example, deregistering of a sink interface from a server component.

Syntax:
   TestCaseCleanup:
     Cleanup TestBlock

Construct 7: TestCaseBody

The test case body includes a set of test statements. The test statements will be executed in the same order as they occur in the ITL source.

Syntax:
   TestCaseBody:
     Body TestBlock
   TestBlock:
     '{' {TestStatement} '}'
   TestStatement:
     TestPurposeStatement|IterationStatement|InterActionEventStatement|TestBlock|SuperStatement|EmptyStatement Construct 8: TestPurpose The test purpose specifies a particular test. It comprises an action statement that contains the code that stimulates the component under test. With an optional assert statement, the return and out-parameters are verified. The optional observe statement allows event patterns to be verified. If an action has an observe block, TECS goes into an event monitoring state after the action is executed. In this state, TECS attempts to match event patterns.

Syntax:
   TestPurposeStatement:
     ActionStatement      [AssertStatement]
     [ObserveStatement]

Construct 9: Action

Within the action block, the stimulus code is written. The action block may include any type of language statement permissible in the target language. All variables used within the action block have to be defined in the test case's attribute definition block. Types also have to be declared in this attribute definition block or they have to be included with a target include statement. An example:

Action a1{
     result=sampleComponent.doXY("Test", id);
   }

An action can have an optional identifier. If the identifier is used, it has to be unique within the test case.

Construct 10: Assert Statement

With the assert statement, the out-parameters and return values of the code executed in the action block can be verified. The assert statement can either be a simple postcondition statement or a set of postcondition statements enclosed in an assert block. Even though multiple postconditions are specified, at least one postconditions is fulfilled at test execution time. If multiple postconditions are fulfilled, TECS treats this as an error. The postcondition may include any expression valid in the target language. The variables used are to be defined in the test cases' attribute definition block. A postcondition can have an optional, nested test statement. This test statement is executed right after the execution of its parent action, if the postcondition is matched. Otherwise, it will not be executed. An example is:

Define {
     Attributes {
       boolean result;
       String id;
     }
   }
   Body {
     Action a1 {
       result=sampleComponent.doXY("Test", id);
     } Postcondition( result==true && id.equals("1"))
   }

In this example, we assume that the method doXY has two parameters. The first parameter is a string in-parameter, the second an integer out-parameter. The test purpose can be viewed as successful when the post condition is met, that means, when doXY returned a value true and an id returned the value"1".

Construct 11: Observer Statement

The observe statement allows the verification of events as a result of the previously executed action. An observe statement can either be a simple event pattern statement or a set of event pattern statements encompassed by an observer block.

After the execution of the action block, TECS goes into an observe state and will remain there until it times out or an event pattern is matched. Whenever the component under test responds, by means of an event, all the current action's event patterns are evaluated. If one of the event patterns is fulfilled, test execution will continue.

Even though multiple event patterns can be specified in an observe block, only one event pattern should be matched at test execution time. If multiple event patterns are matched, TECS will regard this as an error. TECS provides a time-out mechanism to limit the time, it waits for event patterns to be matched. With the optional time-out specification (time-out in ms), the default time-out can be overridden. An example is:

Action a1{
     sampleComponent.doXY("TEST", id);
   }
   Observe Timeout 500 {
     Pattern sink.onOk && sink.done && sink.msg
     Pattern sink.systemEvent
   }

In this example, there are two valid event patterns specified. Both event patterns are defined through an event expression. There is also a time-out limit specified, for example, 500 ms which overrides the default time-out time. Therefore, TECS will time-out 500 ms after the execution of the action, if no event pattern can be matched.

With the optional observe-for statement, TECS can be forced to stay in the observe state for a specified time even though an event pattern could be matched. Once the first event pattern is matched, the only events are allowed to occur are those that allow the first matched event pattern to still be matched. Any other event occurrences are treated as errors. An example:

Action a1
   {...}
   Observe For 5000{
     Pattern $e_1 >= 1$
   }

Figure 10:
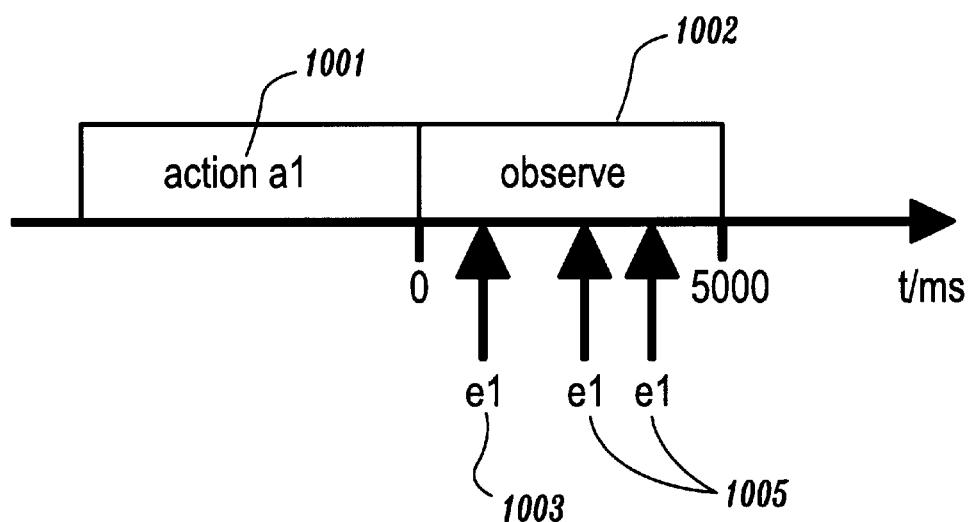
FIG. 10 shows a valid scenario during test execution where a component under test responds to stimuli with events after an action has been executed.

In this example, the component under test is allowed to respond to stimuli with events of type $e_1$ for 5000 ms after the action has been executed. FIG. 10 shows a valid scenario. Shortly after the execution of action a1 (1001), an event of type $e_1$ (1003) occurs. The event pattern can be matched at this time, but TECS is forced to stay in the observe state (1002).

Further events of type $e_1$ (1005) are allowed to occur ($e_1 \geq 1$). As the event pattern is satisfied the first time around, these other events (1005) are allowed.

Figure 11:
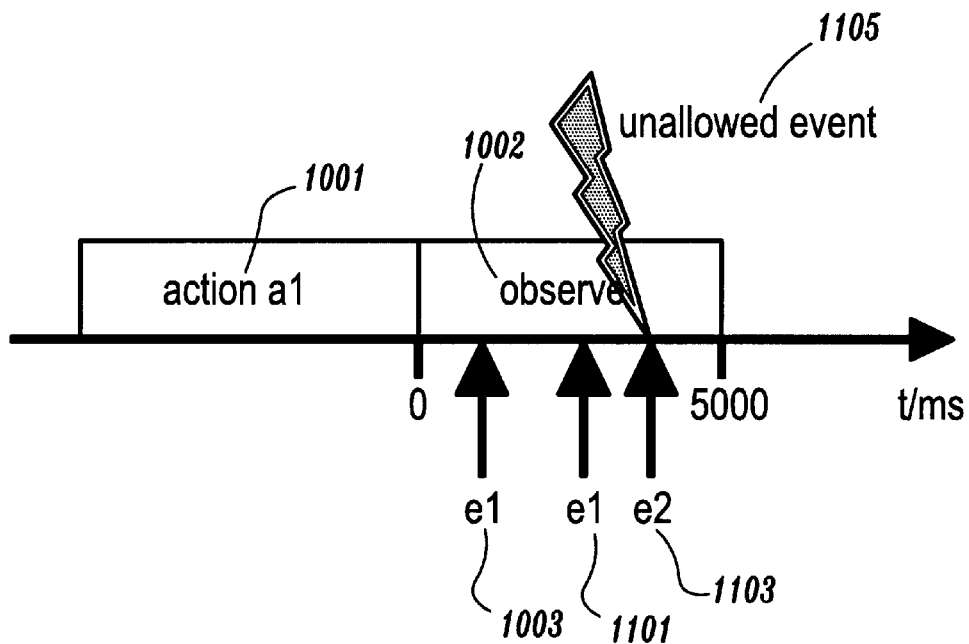
FIG. 11 shows an invalid scenario during test execution where a component under test responds to stimuli with an event that is treated as unallowed.

FIG. 11 shows a slightly different scenario. After the second event of type $e_1$ (1101), an event of type $e_2$ (1103) occurs. Now, the event pattern cannot be matched anymore. Therefore, the event of type $e_2$ will be treated as an unallowed event (1105), or error.

Construct 12: EventPattern Statement

An event pattern includes an event expression and an optional nested test statement. The event pattern is considered as matched, when the event expression is satisfied.

Whenever an event pattern with a nested test statement is matched, test execution continues with these nested test statements before it executes the next higher level action. An example is:

```
Action a1 {
    sampleComponent.doXY("TEST", id);
}
Observe {
    Pattern sink.onOk && sink.done {
        Action a1_1 {
        sampleComponent.doYZ( );
        }
        Observe{
            Pattern sink.msg
        }
    }
    Pattern sink. systemEvent {
        Action a1_2{
            sampleComponent.doUV( );
        }
    }
}
Action a2 {
...
```

In the above example, the action a1 has two event patterns. Assume that after the execution of doXY, the event onOk and the event done occur. Therefore the first event pattern would be matched. Test execution would continue with the nested action a1_1 (not shown). After the successful execution of this nested test statement, test execution would continue with the higher-level action a2. Note, the nested action a1_2 (not shown) would not be executed as its event pattern is not matched.

Construct 13: EventExpression

Event expressions are a means to define event patterns. An event pattern is defined through the occurrence of certain event types.

Table 1 is an example showing an event pattern in tabular form ($t_1 < t_2 < t_3 \ldots$):

TABLE 1

| time | $t_1$ | $t_2$ | $t_3$ | $t_4$ | ... |
|---|---|---|---|---|---|
| event type | $e_1$ | $e_2$ | $e_1$ | $e_3$ | ... |

We see that three different event types occur: $e_1 \ldots e_3$. First the event $e_1$ occurs, then $e_2$, etc.

The above example could be matched with the following event expression:

$e_1 == 2$ && $e_2 == 1$ && $e_3 == 1$

Table 2 shows all the event operators with their precedence and evaluation direction. A high rank means that this operator is evaluated first. Operators with the same rank will be evaluated from left to right. The rank is followed by a L or R. These letters show whether the operator is left or right associative. Brackets can be used to force another evaluation order.

TABLE 2

The Event Operators

| rank | symbol | description |
|---|---|---|
| 5L | <, <=, >, >=, ==, != | relational operators |
| 4L | Before | event order operator |
| 3L | && | logical and operator |
| 2L | ^ | logical exclusive or operator |
| 1L | \|\| | logical or operator |

These are the basic operators. Further operators can be added as long as their semantics (especially in combination with the other operators) are clear.

Construct 14: Relational Operators

The relational operators can be used together with event types (see 0) to express how many times an event of a certain type has to occur.

For example:

$e_1 == 2$ //event of type e1 has to occur exactly twice $e_1 >= 2$ //event of type e1 has to occur at least twice $e_1 != 2$ //event of type e1 has to occur zero to n times but twice $e_1 < 100$ //event of type e1 must occur less than 100 times $e_1$ //event of type e1 has to occur exactly once An event type without a relational operator means that the event has to occur exactly once.

Construct 15: The Boolean Operators

There are the basic boolean operators available: the and-operator, or-operator and xor-operator. Table 3 shows the results of the different operators depending on the left and right operands (a"1" means satisfied, a"0" means not satisfied).

TABLE 3

The boolean operators

| operand | | result | | |
|---|---|---|---|---|
| left | right | && (and) | ^ (xor) | \|\| (or) |
| 0 | 0 | 0 | 0 | 0 |
| 0 | 1 | 0 | 1 | 1 |
| 1 | 0 | 0 | 1 | 1 |
| 1 | 1 | 1 | 0 | 1 |

Note that there is an or-operator and an xor-operator available. In the context of event patterns, the xor-operator might be used quite a lot. Very often either event pattern $e_1$ is allowed to occur or event pattern $e_2$ but not both together.

$e_1$ ^ $e_2$ //$e_1$ or $e_2$ is allowed to occur, but not both $e_1$ || $e_2$ //$e_1$ or $e_2$ is allowed to occur. $e_1$ and $e_2$ is ok too The boolean operators don't involve any timing constraints. It doesn't matter whether the left or the right operand has been satisfied first.

For example:

$e_1 == 2$ && $e_2$ //event type e1 has to occur twice and event type e2 once

Valid event patterns are:

| time | $t_1$ | $t_2$ | $t_3$ |
|---|---|---|---|
| event type | $e_1$ | $e_1$ | $e_2$ |
| or | | | |
| event type | $e_1$ | $e_2$ | $e_1$ |
| or | | | |
| event type | $e_2$ | $e_1$ | $e_1$ |

Note that there is no boolean "not" operator available. The reason lies in the semantics of event patterns. When an event pattern is matched, all occurred events have to be consumed by the event expression, no additional events are allowed. Therefore, there is no need to specify which events aren't allowed to occur. The rule is simple: No event is allowed to occur unless it is required by an event expression.

Construct 16: Event Order Operators

In contrast to the boolean and operators—which do not have any requirements on the order of the event occurrence—the Before operator needs the left operand to be fulfilled before the right operand.

Some examples:

$e_1$ Before $e_2$ //event of type e1 has to occur once, then the event of type e2 once $e_1$ Before $e_2$ Before $e_3$ //the events e1, e2, e3 have to occur once in this order $e_1$ Before $e_2$ Before $e_1$ //first the event type e1 has to occur, then e2 and then e1 again ($e_1$ && $e_2$) Before $e_3$ //the sequences (e1, e2, e3) or (e2, e1, e3) are valid With the usage of the Before operator one assumes that the operands have a time associated, otherwise the definition of an order does not make sense. For a relational expression (e.g. $e_1$==1) the associated time is apparent. It's the time when the expression is satisfied. For the and operator, the time associated is the one of the and operator's operand that was satisfied as the last.

| event expression | reference time for ordering |
|---|---|
| $e_1$==1 | occurrence of e1 |
| $e_1$==2 | occurrence of second event e1 |
| $e_1$ && $e_2$ | occurrence of the later event |

Construct 17: Allowed and Unallowed Events

After the execution of an action, the test environment goes into an observe state. In this state, it tries to match one of the defined event patterns. On each event occurrence, all the defined event patterns are evaluated. In addition to this, the test environment also checks for unallowed events. The definition of an unallowed event is:

Any event that cannot be consumed by the matched event pattern is an unallowed event.

An event is consumed when it is needed by an event expression to be fulfilled. All the events that are involved in a matched event expression are consumed. The only exception is the xor-operator. For this operator just the events of the matched operand are consumed.

An example:
Action a1
{...}
Observe
{
Pattern e1 && e2 ^ e3 && e4
}

Scenario 1:

Assuming that an event of a first type (for example, e5) occurs after the execution of action a1, the test environment would treat this as an unallowed event since none of the event patterns require an event of type $e_5$ to occur. This happens before any of the event patterns could be matched, as the event type isn't required by any of the patterns. Therefore it cannot be consumed by any of the event patterns.

Scenario 2:

| time | $t_1$ | $t_2$ | $t_3$ |
|---|---|---|---|
| event type | $e_1$ | $e_3$ | $e_2$ |

After the execution of the action a1 an event of type $e_1$ occurs. This is an allowed event as it might be consumed by the left operand of the xor-operation. At the time $t_2$ an event of type $e_3$ occurs. This event is allowed up to now as it might be consumed by the right operand of the xor-operation. At the time $t_3$ the event pattern can be matched, an event of type $e_1$ and $e_2$ occurred. The event of type $e_3$ that occurred at the time $t_2$ now becomes an unallowed event as it is not consumed by the matched event pattern.

Another example:
...
Observe
{
Pattern $e_1$==2 && $e_2$==1 && $e_3$==1
}
Occurred events:

| time | $t_1$ | $t_2$ | $t_3$ | $t_4$ | $t_5$ |
|---|---|---|---|---|---|
| event type | $e_2$ | $e_1$ | $e_2$ | $e_3$ | $e_1$ |

Because of the event $e_2$ that occurs at the time $t_3$ a second time, the event pattern cannot be matched anymore. In this case, the test environment will leave the observe state after the timeout has become active. This will lead to a time-out error.

It is also conceivable that the test environment recognizes events that make it impossible to match an event pattern. If such a feature were implemented, the event $e_2$ that occurs at the time $t_3$ could be treated as unallowed event and the observe state terminated.

Note that multiple event patterns in an observe block are equivalent to an xor-operation of the event patterns. Only one event pattern of an observe block can be matched.

```
...                              ...
Observe                          Observe
{                  equals        {
  Pattern e1 ^ e2                  Pattern e1
}                                  Pattern e2
                                 }
```

Construct 18: Interaction Events

Events that occur after an event pattern is matched undergo the following example:
Action a1

```
{
    . . .
}
Observe
{
    Pattern e₁
}
Action a2
{
    . . .
}
Observe
{
    Pattern e₂
}
```

Figure 12:
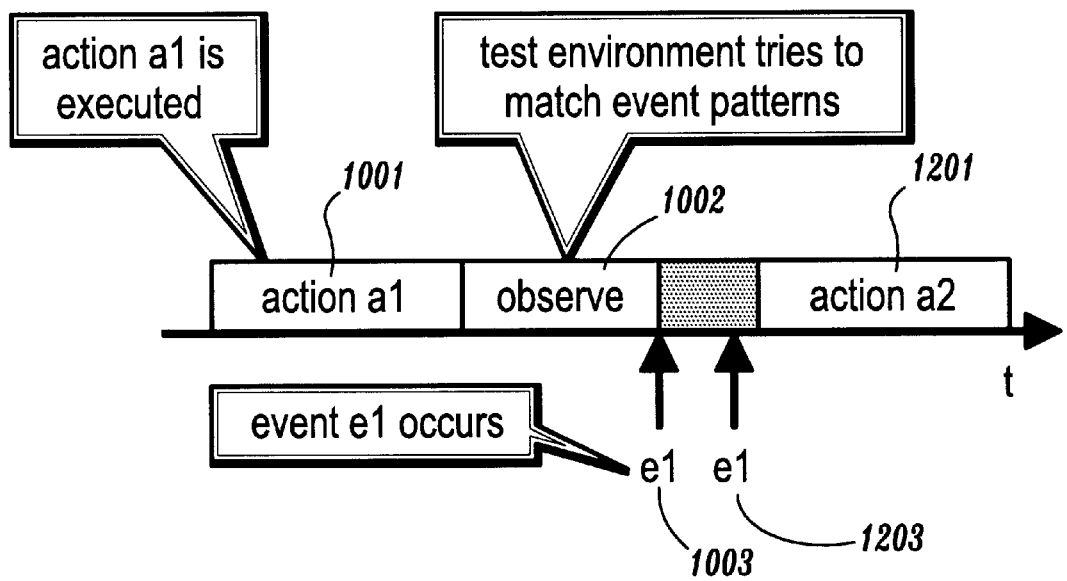
FIG. 12 shows a scenario during test execution where a component fires a second event after an event pattern has been matched but before a second action.

As a result of action a1 an event of type $e_1$ has to occur. FIG. 12 shows a possible scenario during the test execution.

After the execution of action a1 (1001), the test environment goes into the observe state (1002). As the event $e_1$ (1003) occurs, the event pattern can be matched. This causes the test environment to terminate the observe state and to continue with the execution. Before the execution of action a2 (1201) actually starts, the software under test wrongly fires a second event $e_1$ (1203). This interaction event will be treated as an error as there is no interaction event statement around the action.

Figure 13:
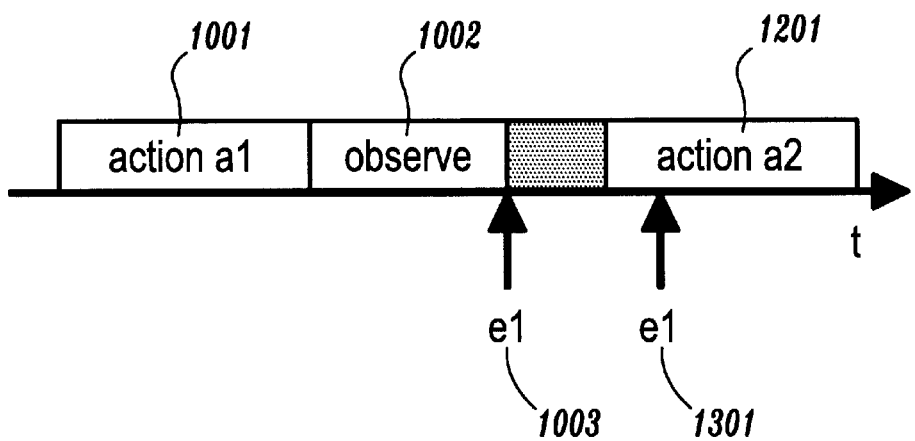
FIG. 13 shows a scenario during test execution where a component fires a second event after an event pattern has been matched and after execution of a second action.

It is also conceivable that the second event e1 would be fired after the execution of action a2 has started, as depicted in FIG. 13.

This occurrence of the second event e1 (1301) would be treated as an unallowed event error, since action a2 (1201) doesn't require any events of this type to occur.

Figure 14:
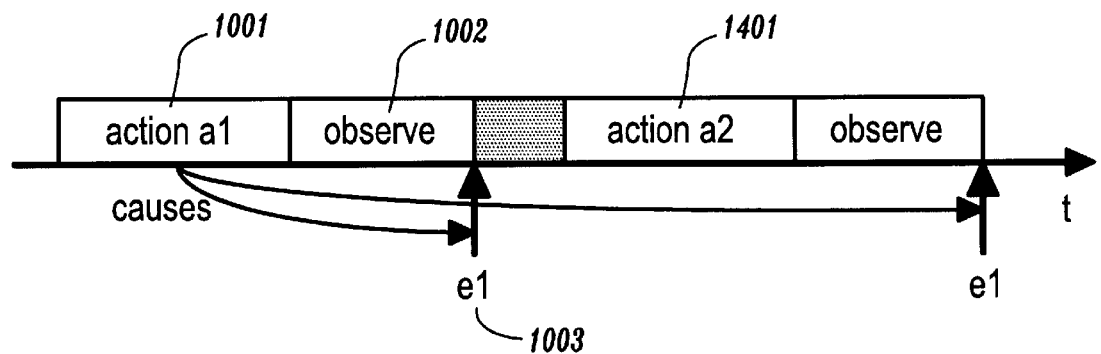
FIG. 14 shows an error situation during test execution where a second action waits for an event but does not cause a second event.

FIG. 14 shows an error situation that cannot be recognized with a black-box testing approach; this scenario is very similar to FIG. 13. The difference is, that action a2 (1401) also waits for an event e1 (1003) and as a result of an error in the software under test, action a2 doesn't cause an event e1. So, the misbehavior of action a1 (1001) and action a2 somehow compensate each other.

Figure 15:
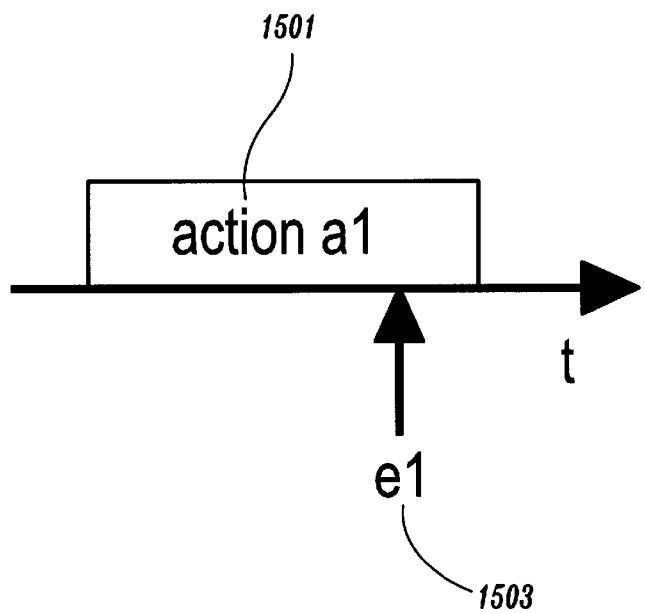
FIG. 15 shows a scenario during test execution where an event occurs while an action is in execution.

Events that occur while the action is in execution are completely legal. The test environment observes any events at any time. For example, in FIG. 15, if an event pattern e1 (1503) can already be matched after the execution of an action a1 (1501), the observe state (1002, FIG. 10) won't be entered.

```
Action a1
{
    . . .
}
Observe
{
    Pattern e₁
}
```

Construct 19: EventType

An event type is specified through:

A method name, which specifies what method is called upon the event occurrence.

A sink object reference, which specifies on what sink object the method is called.

An event type has an integer value, which represents the number of times this event occurred. As long as an event of a certain event type hasn't occurred yet, the event type has the value 0. Afterwards, its value is incremented each time the event occurs.

Syntax:
  EventType:
    Sink.MethodName [EventConstraint]

An event type specification can have an optional constraint specification (discussed further in Construct 20, below).

As events are usually used for one way communication from server to the client and therefore usually don't have any out-parameters or return types, ITL doesn't provide a means to set values for out-parameters of sink methods or return values. Still this could be achieved by subclassing the sink objects generated out of the IDL file with specific behavior.

Construct 20: EventConstraint

Through an event constraint, one can express certain requirements to the actual arguments of an event. A constrained event can also be viewed as a subtype of the unconstrained event. As mentioned in Construct 19 above, each event type has a value that reflects the number of occurrences of this event. For each constrained event used in an event expression there will be a separate counter. The constrained event's counter just will be incremented, when the event occurred with the constraint satisfied. If the constraint isn't satisfied, it will be treated as a base event. If this event is not required by the event expression, it will be treated as an unallowed event.

An event constraint can contain any boolean expression built out of arguments of the sink method. The names of the arguments must conform to the ones used in the IDL specification of the sink interfaces.

Syntax:
  EventConstraint:
    '('Expresssion ')'

An example:

Let's assume the sink interface is specified through the following CORBA IDL file:

```
interface SiteLocalSink
{
    enum  ConnectError{INVALID_USER,
        COMMUNICATION_ERROR};
    void onSiteConnectionFailed(in ConnectError reason);
}
```

The object reference siteSink in the following code refers to a sink object that implements the SiteLocalSink interface. A possible event constraint would be the following:

Pattern siteSink.onSiteConnectionFailed(reason==
    ConnectError.INVALID_USER)==1

In the above example, the event pattern will be fulfilled as soon as the siteSink.onSiteConnectionFailed event occurred once with a value INVALID_USER as its reason parameter. If it occurs with another value for the reason parameter it would be treated as an unallowed event as the event expression does not need this event.

Note that an event constraint is tied to an event type. That means an event expression including several event types can have multiple event constraints:

Pattern sink.onX(id==1) && sink.onY(param1=="hello")
  Pattern sink.onX(id==1) && Pattern sink.onX(id==2)

In the above example, the event sink.onX has to occur twice, once with parameter id having a value 1 and once having a value 2.

Construct 21: Iteration Statement

ITL supports three different iteration statements:

live The syntax is the similar to C++ or Java:

IterationStatement:
    WhileLoop|DoWhileLoop|ForLoop
  WhileLoop:

```
While '('Expresssion')' TestStatement
DoWhileLoop:
    Do TestStatement While '('Expresssion')' ';'
ForLoop:
    For '('(Declaration|Expresssion';'|';')[Expresssion]';'
        [Expresssion]')'
    TestStatement
An example:
Testcase TC1 {
Define {
Attribute {
    boolean isOK=true;
    boolean continue=true;
    }
}
Body
{
    For (int i=0; i<10; i++)
    {
        Action a1 {. . . }
    }
    While (isOK)
    {
        Action a2 {. . . }
        Observe
        {
            Pattern e1
            {
                Do
                {
                    Action a2_1 {. . . }
                } While (continue);
            }
        }
    }
}
}
```

Construct 22: InterActionEvents Statement

Usually, events that occur between test purposes are unallowed events (see, for raw example, above) and will be treated as misbehavior of the software under test. In some cases, this behavior is too strict. Let's assume an action that initiates the component under test to fire events periodically until it will be turned off with a later action. All the events fired between the two actions would be treated as unallowed events even though they're supposed to occur. By embracing these test purposes with an inter-action event statement the problem can be solved.

With the InterActionEventsStatement a set of event types can be specified that will be allowed to occur between and within the subsequent test purposes even though they are not specified within an event pattern.

Syntax:
```
InterActionEventsStatement.
    InterActionEvents        '('EventList')'
    '{'{TestStatement}'}'
EventList:
    EventType '{','EventType'}'
```
Not that even though the syntax allows specifying event constraints, the event types will be treated as simple unconstrained events.

Construct 23: Include Statements

ITL supports two include statements, the target include statement and the IDL include statement are described above.

TargetInclude Statement:

The types used within the target code fragments (e.g. in an action block or an attribute definition block) have to be declared. The target include statements allows to include type declarations on target language level.

Note that the target include statement is not intended to include ITL source files and should not be used for this purpose!

Syntax:
```
TargetIncludeStatement:
    Include String ';'
```
An example:

Test cases that use the windows API function CoCreateInstance. All the required windows header files are included in the stdafx.h file. It is therefore sufficient to include the header file stdafx.h .

```
Include "stdafx.h";
Include "..\abc.h";
Testcase TC1 {
    Body
    {
        Action a1
        {
            CoCreateInstance( . . . );
        }
    }
}
```

IdlInclude Statement:

The interface types referred to by the sink generation and sink declaration statement can be made accessible to the ITL compiler through the IDL include statement.

Any interface type referred to from within an ITL script has to be declared through an included IDL file.

Syntax:
```
IdlIncludeStatement:
    IncludeIdl String';'
```
An example:
```
IncludeIdl "..\IDL\IfcSimple.idl";
Generate Sink CSimple From ISimple;
Testcase TC1 {
    Body
    {
        Action a1
        {
            CoCreateInstance( . . . );
        }
    }
}
```

The interface type ISimple is declared in the file IfcSimple.idl. As the sink generation statement refers to this interface type, it has to be included through an IDL include statement.

Construct 24: Super Statement

The super statement allows executing the corresponding block of the super test case. In the init block it executes the init block of the super test case, in the cleanup block it executes the cleanup block of the super test case.

Syntax:
```
SuperStatement:
    Super '(' ')' ';'
```
An example:
```
Testcase SubClass Extends SuperClass {
    Init
    {
```

```
Super( ); //call the init block of the super test case
   . . . //further initialization work
}
. . .
Cleanup
{
   . . . //do some cleanup work
   Super( ); //call the cleanup block of the super test case
}
}
```

The super statement can also be used in the body block.

Construct 25: SinkGeneration Statement

The sink generation statement serves two purposes:

It declares a sink type

It automatically invokes the Sink Generator in order to generate the sink implementation for the specified interface type.

Syntax:

SinkGenerationStatement:
   Generate Sink Identifier From Identifier';'

The first identifier defines the type name of the sink class to be generated, the second the interface for which the sink shall be generated.

Any sink type used by a sink definition statement (see above) has to be declared in the ITL script, either through a sink generation statement or through a sink declaration statement. In contrast to the latter one, the sink generation statement also invokes the sink generator.

An example:

```
IncludeIdl "IfcXY.idl";
Generate Sink CSimple From ISimple;
Testcase Test1
{
   Define
   {
      Sink CSimple As simpleSink;
   }
   . . .
}
```

Driven by the above sink generation statement, the IDL compiler invokes the sink generator, which generates the sink implementation for the sink interface ISimple. The name of the class that implements the sink is CSimple.

Construct 26: SinkDeclaration Statement

The sink declaration statement provides the information of what interface type is implemented by a sink type. The sink declaration statement is just used in the case the test developer subclasses a generated sink object. In this case, the sink generation statement allows to express what interface actually is implemented by the derived sink type.

SinkDeclarationStatement:
   Declare Sink Identifier From Identifier';'

An example:

```
IncludeIdl "IfcXY.idl";
Generate Sink CSimple From ISimple;
Declare Sink CDerived From ISimple;
Testcase Test1
{
   Define
   {
      Sink CDerived As aSink;
   }
}
. . .
```

In the above example, the sink definition statement defines a sink aSink of type CDerived. CDerived is a class written by the test developer that extends the generated class CSimple. The sink declaration statement provides the information, that the type CDerived actually implements an interface of type ISimple. As the ITL compiler does not parse the C++ code, it cannot figure this out by itself, therefore, the sink declaration statement is needed Construct 27: Comments in ITL ITL supports single and multi line comments. For example:

```
//This is a single line comment in ITL
/* This is
a multi
line comment in ITL
*/
```

Nested multi line comments are not supported in ITL.

The current implementation of the ITL compiler has a limitation: a single line comment should not be at the last line of a file. A new line is needed after a single line comment.

Construct 28: Special Comments in ITL

In addition to the regular comments, ITL also supports special comments. Special comments provide a means for putting additional embedded documentation into the ITL source. A special comment of type Description can be used to add further description to an ITL construct. Special comments can also be used for declarative programming, e.g., in a COM world it would make sense to have a special comment of the type "ThreadingModel"which defines the threading model in which a test case shall be run.

A special comment is similar to a regular multi line comment, except that it starts with the character sequence "/**".

ITL allows structuring special comments with the means of keywords. Each special comment is leaded by a keyword that defines the type of the following special comment. Keywords start with the two characters "@@". Multiple keywords can be combined in one special comment.

An example:

```
/**
* @@Description
This test case tests the string manipulation functions
implemented in the subsystem XY.
*/
Testcase TestStringFunctions {
   . . .
   Body
   {
      /**
      @@Description Concatenate two strings
      */
      Action {. . . }
      /**
      * @@Description Concatenate two empty strings
      */
      Action {. . . }
      Observe
      {
         /**
         * @@Description The most common pattern
         */
         Pattern . . .
```

```
/**
 * @@Description The pattern matched in case of an
     error
 */
    Pattern . . .
}
}
```

In the above example, further embedded documentation is added to the test case, action and event patterns with the means of a special comment of the type description.

Further types of special comments are conceivable depending on the concrete environment, e.g., a special comment of type "ThreadingModel" in a COM world. This document is a neutral description of the ITL language and does therefore not define any environment specific special comments.

The following table lists the types of special comments supported by ITL. The last column lists the ITL constructs to which the type of special comment is applicable.

| Keyword | Description | Applicable to Construct |
|---|---|---|
| @@ Description | Marks a special comment of the type description | TestCase, ActionStatement, PostconditionStatment, EventPatternStatement |

The following is a description of how TECS would interact with the component under test using a sequence of SEND and RECEIVE events instead of the ITL-based action and observe statements. The SEND and RECEIVE events are used only for illustrative purposes and to better convey the steps involved in executing test cases written in the ITL test specification language and generated by TDE/UML:

*SEND_tuser.msg( );
*RECEIVE_txport.data0( );

The intent of the SEND event is to stimulate the object under test. To do so, the connection _tuser is mapped to an object reference, which is stored in a variable_tuser defined in the test case. The event msg is mapped to a method call on the object referenced by _tuser.

The RECEIVE event represents a response from the object under test, which is received by an appropriate sink object. To do so, the connection_txport is mapped to an object reference that is stored in a variable_txport. The event data0 is mapped to a callback, such that the object under test fires the event by calling back to a sink object identified by the variable_txport. The sink object thus acts as a stub for an object that would implement the txport interface on the next higher layer of software. Reactive software components expose an interface that allows interested parties to subscribe for event notification.

Figure 16:
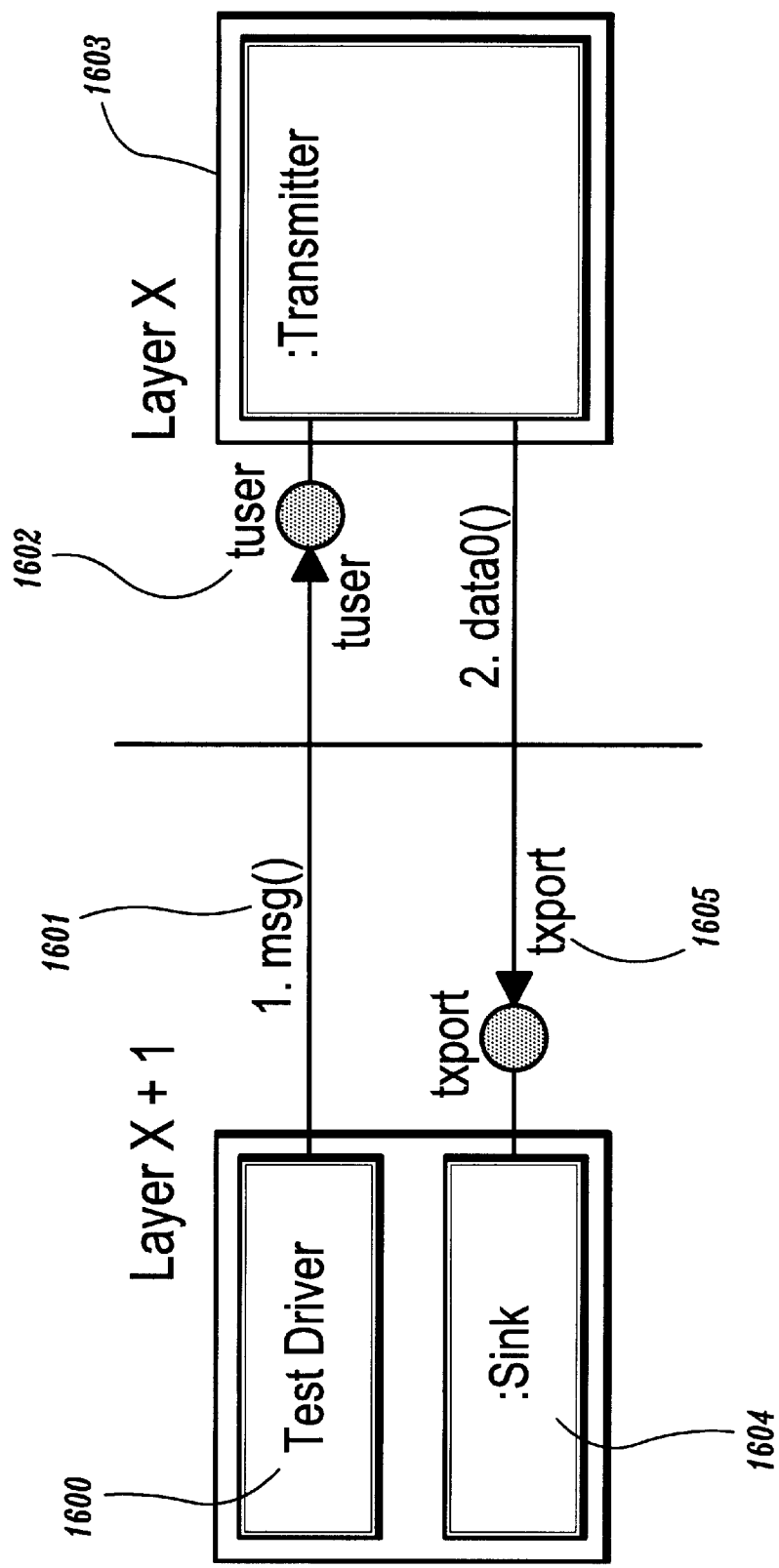
FIG. 16 shows an interaction between a test execution environment and a Transmitter object.

An example of the interactions between a test execution environment and a Transmitter object are shown in FIG. 16. The TestDriver (1600) calls the method msg( )(1601) on the Transmitter object (1603) referenced through the variable _tuser (1602). The Transmitter object notifies the sink object (1604) via its outgoing _txport (1605) interface.

Test case execution involving RECEIVE events not only need a comparison of the out-parameters and return values with expected values, but also the evaluation of event patterns. These event patterns specify which events are expected in response to particular stimuli, and when they are expected to respond by. To accomplish this, the sink objects associated with the test cases need to be monitored to see if the needed sink methods are invoked.

Figure 17:
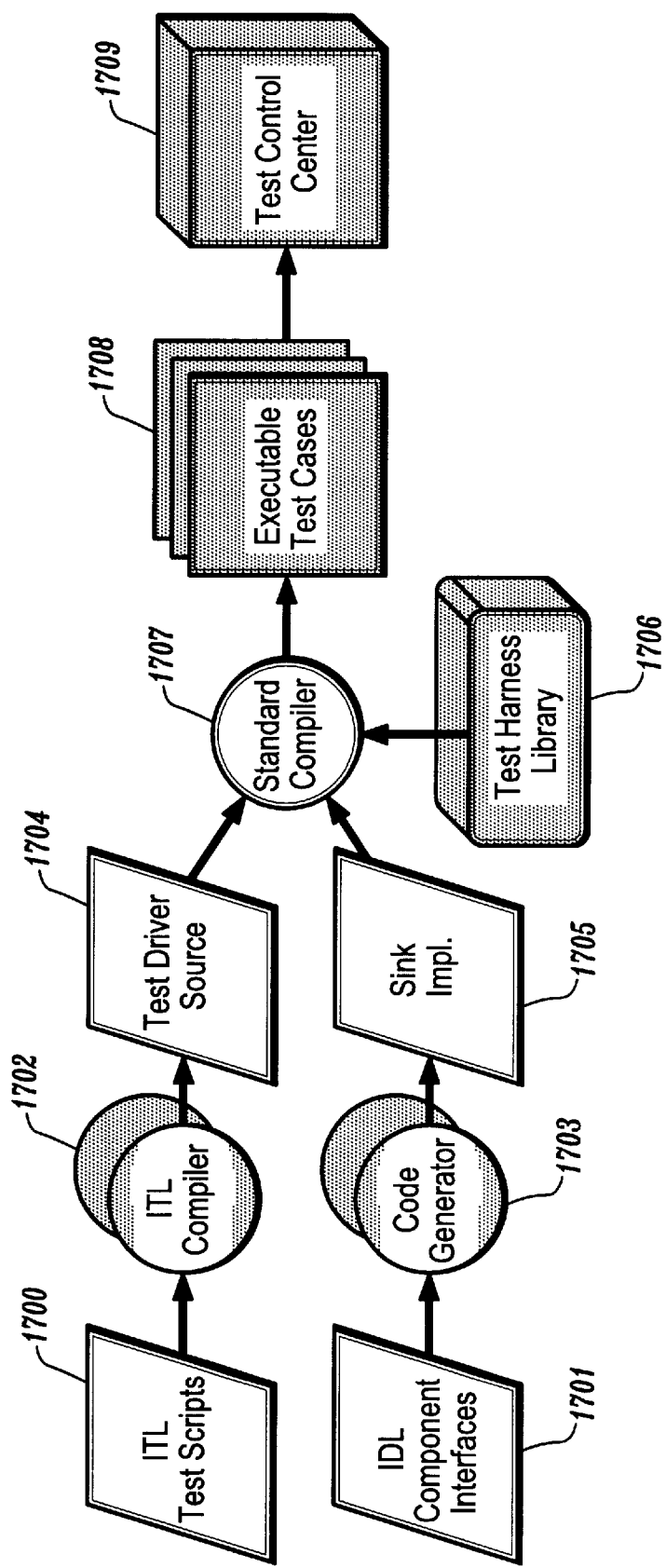
FIG. 17 is a diagram showing the elements of a Test Environment for Distributed Component-Based Software (TECS) according to one aspect of the present invention.

FIG. 17 shows elements of the Test Environment for Distributed Component-Based Software (TECS). TECS specifically addresses test execution and is specifically designed preferably, for testing middleware-based components during unit and integration testing. TECS can be used as part of the TnT environment or as a standalone tool.

Elements that are part of the TECS environment are highlighted with a 3D shape in FIG. 17 and include the ITL compiler 1702, Sink Generator 1703, Test Harness Library 1706, executable test driver including test cases 1708, and the test control center 1709. These are defined as follows:

Test Harness Library (1706)—this is an object-oriented framework that provides the basic infrastructure for TECS to create an executable test driver. It includes the following functionality:event monitoring—TECS has to observe events that occur when running the test cases;

argument checking—TECS is capable of verifying that the actual values of the parameters associated with the method and sink parameters have to be compared with the excepted ones, and TECS provides a framework for doing these checks;

generation of a test result journal—TECS generates a result journal summarizing the results of the executed test cases; and ITL Compiler (1702)—this is a tool which is used to translate ITL test case definitions into a standard object-oriented language program. The generated test cases closely co-operate with the Test Harness Library. A standard object-oriented language compiler is then used to create an executable test driver out of this generated code as well as the code for the Test Harness Library. The test drivers are themselves COM-based components.

Sink Generator (1703)—it automatically generates standard object-oriented code for the sink objects from a description of the component interfaces defined in an IDL file. This file was automatically generated during component development by the standard object-oriented language compiler. This code is compiled together with the code for the test harness library using a standard object-oriented language compiler.

Test Control Center (1709)—it provides a user with the means of running test cases interactively through a graphical user interface or in batch mode. The information generated during test execution is written into a tracefile of XML (extensible Markup Language) format. The Test Control Center can provide a user-customizable view of the test execution trace, an error list, and an execution summary. Further views can easily be defined by writing additional XSL (eXtensible Style Language) style sheets.

4. Evaluating the Example

Using the alternating bit protocol example of FIG. 2, the following describes an application of the functional testing method of the present invention:

a) Component Statistics

Table 4 shows the number of states and transitions for the four state machines before and after they were imported into the TDE/UML tool and internally converted into a normalized global model. The following experimentation is used to highlight the flow. In the example, the normalized state machine (in terms of the number of states and transitions) for each component is never more than twice the size of its associated state machine.

TABLE 4

| | State Diagram | | Normalized FSM | |
|---|---|---|---|---|
| Component | States | Transitions | States | Transitions |
| Transmitter | 6 | 8 | 12 | 14 |
| Timer | 3 | 4 | 4 | 5 |
| Comch | 5 | 8 | 5 | 10 |
| Receiver | 8 | 14 | 16 | 22 | b) Applying the Incremental Composition and Reduction Algorithm

The time taken for the import of these four state machines as well as the execution time for the composition algorithm was negligible. Table 5 shows the number of states/transitions created during the composition step as well as the values for when the reduction step is not applied. Typically, the reduction algorithm is applied after each composition step.

TABLE 5

| | Transmitter | | Timer | | Comch | |
|---|---|---|---|---|---|---|
| | reduced | not red. | reduced | not red. | reduced | not red. |
| Timer | 20/24 | 20/24 | | | | |
| Comch | 26/38 | 30/42 | 20/55 | 20/55 | | |
| Receiver | 144/244 | 144/244 | 56/106 | 56/106 | 36/58 | 48/68 |

| Subsystem | reduced | not reduced |
|---|---|---|
| Timer, Transmitter, Comch | 46/64 | 54/74 |
| Transmitter, Comch, Receiver | 90/126 | 114/152 |
| Timer, Transmitter, Comch, Receiver | 62/86 | 104/134 |

The values in italic show combinations of components with no common interface. The numbers for these combinations are very high as would be expected. Such combinations are generally not used as intermediate steps. The values in bold indicate the number of states/transitions used for the above integration test strategy. The values show how the number of states/transitions can be substantially reduced as in the case of all four components being evaluated together as a complete system.

For this example, when composing a model without the intermediate reduction steps and instead reducing it after the last composition step, the same number of states and transitions are reached. The difference, however, lies in the size of the intermediate results and the associated higher execution times. While in this case, the benefit of applying the reduction algorithm were negligible due to the size of the example, theoretically it could lead to a significant difference in execution time.

c) Generating and Executing the Test Cases

The time taken to generate the test cases for all three subsystems in this example took less than five seconds. TDE/UML generated a total of 7 test cases for all three subsystems—one test case for the subsystem TransmitterTimer, three test cases for subsystem ComchReceiver and three test cases for ABProtocol. In contrast, an integration approach in which all four components were tested at once with the corresponding interfaces resulted in a total of 4 tests. In this case, the incremental integration test strategy resulted in more test cases being generated than the big-bang approach, but smaller integration steps usually result in a more stable system and a higher percentage of detected errors. An examination of the generated test cases shows that they are not free of redundancy or multiple coverage of communication transitions, but they come relatively close to the optimum.

In an embodiment of the present invention, it is to be appreciated by those skilled in the art that the test generation method and test execution method described herein can support components communicating synchronously and asynchronously. There are two types of communication models:

The shared model, where a single event is broadcast to multiple components, all of which are waiting to receive and act upon it in unison, and The point-to-point blocking communication model, where a single event is sent to just one other component and it is only these two components that are then synchronized.

In asynchronous communication, after a component is stimulated, a response will be received from that component or any other components in the system, sometime in the future.

It is to be appreciated by those of ordinary skill in the art that the present invention may preferably be used for testing components that use middleware, such as CORBA and COM/DCOM. For example, an E-commerce application (used for shopping on the Internet) is made up of three tiers: a browser-based interface where a user types in an item search request, which is sent as an HTTP (Hyper Text Transfer Protocol) to a web server computer (tier 1), which then passes it on to a middle, or business logic tier (tier 2), which is where the application logic reside and the components that we want to test are used. These components may be distributed (residing on different machines in that tier). Once they process the item search request, it is sent to the database (tier 3) where a final result is computed and sent back to the first tier and is viewed by the user. In this example, the present invention is directed towards testing the components executing on the middle tier (tier 2). Other applications are also contemplated.

In another embodiment of the present invention, the entire process of test generation and test execution is automatic; more specifically, the executable test driver and test cases are automatically generated from the UML-based state machine representations. For example, if the implementation of a component were to change, the user would not have to update the test cases, which could be an error-prone and tedious task, but only update the software design expressed by the state machine. After the changes are modeled in the state machine, a new test driver would be regenerated automatically.

Although illustrative embodiments of the present invention have been described herein with reference to the accompanying drawings, it is to be understood that the present invention is not limited to these precise embodiments, and that various other changes and modifications may be affected therein by one skilled in the art without departing from the scope or spirit of the invention. All such changes and modifications are intended to be included within the scope of the invention as defined by the appended claims.

Appendix 1

ITL Grammar

CompilationUnit:

{IncludeStatement}

{DeclarationStatement}

IncludeStatement:

TargetIncludeStatement|IdlIncludeStatement

TargetIncludeStatement:

Include String ';'
IdlIncludeStatement:
IncludeIdl String ';'
DeclarationStatement:
SinkGenerationStatement|SinkDeclarationStatement|
    TestCaseDeclaration|EmptyStatement
SinkGenerationStatement:
Generate Sink Identifier From Identifier ';'
SinkDeclarationStatement:
Declare Sink Identifier From Identifier ';'
TestCaseDeclaration:
Testcase [Identifier] [Extends Identifier]'{'
    [DefinitionBlock] [TestCaseInitialization]
    [TestCaseBody] [TestCaseCleanup] '}'
DefinitionBlock:
Define '{' {DefinitionStatement} '}'
DefinitionStatement:
SinkDefinitionStatement|AttributeDefinitionBlock|
    EmptyStatement
SinkDefinitionStatement:
Sink Identifier As Identifier ';'
AttributeDefinitionBlock:
Attribute Block
TestCaseInitialization:
Init TestBlock
TestCaseCleanup:
Cleanup TestBlock
TestCaseBody:
Body TestBlock
TestStatement:
TestPurposeStatement|IterationStatement|InterAction
    EventsStatement|SuperStatement|TestBlock|Empty
    Statement
TestBlock:
'{' {TestStatement} '}'
TestPurposeStatement:
ActionStatement [AssertStatement] [ObserveStatement]
ActionStatement:
Action [Identifier] Block
AssertStatement:
PostconditionStatement|AssertBlock
PostconditionStatement:
Postcondition '(' Expression ')' TestStatement
AssertBlock:
Assert '{' {PostconditionStatement} '}'
ObserveStatement:
EventPatternStatement|ObserveBlock
EventPatternStatement:
Pattern EventExpression TestStatement
ObserveBlock:
Observe         [TimeoutExpression]
    (';'|'{'{EventPatternStatement}'}')
TimeoutExpression:
Timeout IntegerLiteral|For IntegerLiteral
IterationStatement:
WhileLoop|DoWhileLoop|ForLoop
WhileLoop:
While '('Expresssion')' TestStatement
DoWhileLoop:
Do TestStatement While '(' Expresssion')' ';'
ForLoop:
For '('(Declaration|Expresssion ';'|';') [Expresssion]';'
[Expresssion]')' TestStatement
InterActionEventsStatement:
InterActionEvents '('EventList ')''{'{TestStatement} '}'
SuperStatement:

Super '('')'';'
EmptyStatement:
';'
EventExpression:
OrExpression
OrExpression:
XorExpression {'||' XorExpression}
XorExpression:
AndExpression {'^' AndExpression}
AndExpression:
BeforeExpression {'&&' BeforeExpression}
BeforeExpression:
PrimaryEventExpression {Before PrimaryEventExpression}
PrimaryEventExpression:
RelationalExpression|'('EventExpression ')'
RelationalExpression:
EventType [('<'|'<='|'>'|'>='|'=='|'!=')IntegerLiteral]
EventType:
Sink.MethodName [EventConstraint]
EventConstraint:
'('Expresssion ')'
Sink:
Identifier
Block:
'{' {Statement}; '}'
EventList:
EventType '{' ',' EventType'}'
Statement: any statement in the target language
Expression: any expression in the target language
Declaration: any type declaration in the target language
String: A string enclosed with double quotes
What is claimed is:

1. A method of functionally testing distributed, component-based software comprising the steps of:

modeling dynamic behavior of a plurality of components using a plurality of Unified Modeling Language-based state machine representations;

creating a plurality of normalized Unified Modeling Language-based state machine representations by converting the Unified Modeling Language based state machine representations into a normalized representation;

creating a global behavioral model by combining the normalized Unified Modeling Language based state machine representations;

mapping the global behavioral model to a Test Specification Language (TSL) test design;

processing the Test Specification Language test design in a Test Design Environment to produce a plurality of Interface Test Language (ITL) test cases;

mapping the ITL test cases to object-oriented code using an ITL compiler;

generating a plurality of sink objects defined in an IDL file using a sink generator; and generating an executable test driver including a plurality of executable test cases using code from a test harness library and the object-oriented code using an object-oriented compiler.

2. The method of claim 1, further comprising the step of executing the test cases with a test control center.

3. The method of claim 1, wherein the Unified Modeling Language-based state machine representation includes a plurality of states and transitions for defining all possible states and changes of state a component achieves during its lifetime.

4. The method of claim 1, wherein the normalized Unified Modeling Language-based state machine representation includes a Unified Modeling Language-based state machine representation having one send event or receive event per transition.

5. The method of claim 1, wherein the normalized Unified Modeling Language-based state machine representation is defined using an enhanced Unified Modeling Language notation.

6. The method of claim 1, further comprising the step of defining one or more subsystems including components, by a user to specify an order in which components are to be combined in the global behavioral model.

7. The method of claim 1, wherein the global behavioral model is composed by applying an enhanced version of an incremental composition and reduction algorithm.

8. A system for functionally testing distributed, component-based software, comprising:

a plurality of normalized Unified Modeling Language-based state machine representations constructed by converting a plurality of components modeled by a plurality of Unified Modeling Language-based state machine representations into a normalized representation;

a global behavioral model constructed by combining the normalized Unified Modeling Language based state machine representations, the global behavioral model being mapped to a Test Specification Language (TSL) test design;

means for processing the Test Specification Language test design in a Test Design Environment to produce a plurality of Interface Test Language (ITL) test cases;

means for mapping the ITL test cases to object-oriented code using an ITL compiler;

means for generating a plurality of sink objects defined in an IDL file using a sink generator; and means for generating an executable test driver including a plurality of executable test cases using code from a test harness library and the object-oriented code using a object-oriented compiler.

9. The system of claim 8, further comprising a test control center for executing the test cases.

10. The system of claim 8, wherein the Unified Modeling Language-based state machine representation includes a plurality of states and transitions for defining all possible states and changes of state a component achieves during its lifetime.

11. The system of claim 8, wherein the normalized Unified Modeling Language-based state machine representation includes a Unified Modeling Language-based state machine representation having one send event or receive event per transition.

12. The system of claim 8, wherein the normalized Unified Modeling Language-based state machine representation is defined using an enhanced Unified Modeling Language notation.

13. The system of claim 8, further comprising one or more subsystems including components defined by a user to specify an order in which components are to be combined in the global behavioral model.

14. The system of claim 8, wherein the global behavioral model is composed by applying an enhanced version of an incremental composition and reduction algorithm.

15. The system of claim 8, wherein the test driver includes one or more sink objects for receiving responses from the component under test.

16. A program storage device readable by machine, tangibly embodying a program of instructions executable by the machine to perform method steps for functionally testing distributed, component-based software, the method steps comprising:

modeling dynamic behavior of a plurality of components using a plurality of Unified Modeling Language-based state machine representations;

creating a plurality of normalized Unified Modeling Language-based state machine representations by converting the Unified Modeling Language based state machine representations into a normalized representation;

creating a global behavioral model by combining the normalized Unified Modeling Language based state machine representations;

mapping the global behavioral model to a Test Specification Language (TSL) test design;

processing the Test Specification Language test design in a Test Design Environment to produce a plurality of Interface Test Language (ITL) test cases;

mapping the ITL test cases to object-oriented code using an ITL compiler;

generating a plurality of sink objects defined in an IDL file using a sink generator; and generating an executable test driver including a plurality of executable test cases using code from a test harness library and the object-oriented code using a object-oriented compiler.

17. The program storage device of claim 16, further comprising the step of executing the test cases with a test control center.

18. The program storage device of claim 16, wherein the Unified Modeling Language-based state machine representation includes a plurality of states and transitions for defining all possible states and changes of state a component achieves during its lifetime.

19. The program storage device of claim 16, wherein the normalized Unified Modeling Language-based state machine representation includes a Unified Modeling Language-based state machine representation having one send event or receive event per transition.

20. The program storage device of claim 16, wherein the normalized Unified Modeling Language-based state machine representation is defined using an enhanced Unified Modeling Language notation.

21. The program storage device of claim 16, further comprising the step of defining one or more subsystems including components, by a user to specify an order in which components are to be combined in the global behavioral model.

22. The program storage device of claim 16, wherein the global behavioral model is composed by applying an enhanced version of an incremental composition and reduction algorithm.

* * * * *